US012694830B2

(12) United States Patent
Zhai et al.

(10) Patent No.: US 12,694,830 B2
(45) Date of Patent: Jul. 28, 2026

(54) DISPLAY PANEL COMPRISING PIXEL CIRCUIT AND DISPLAY APPARATUS

(71) Applicant: Tianma Advanced Display Technology Institute (Xiamen) Co., Ltd., Xiamen (CN)

(72) Inventors: Yingteng Zhai, Xiamen (CN); Zhenyu Jia, Xiamen (CN); Tianyi Wu, Xiamen (CN)

(73) Assignee: TIANMA ADVANCED DISPLAY TECHNOLOGY INSTITUTE (XIAMEN) CO., LTD., Xiamen (CN)

(*) Notice: Subject to any disclaimer, the term of this patent is extended or adjusted under 35 U.S.C. 154(b) by 0 days.

(21) Appl. No.: 18/929,626

(22) Filed: Oct. 29, 2024

(65) Prior Publication Data

US 2026/0051290 A1 Feb. 19, 2026

(30) Foreign Application Priority Data

Aug. 19, 2024 (CN) ......................... 202411136529.6

(51) Int. Cl.
*G09G 3/3233* (2016.01)

(52) U.S. Cl.
CPC ... *G09G 3/3233* (2013.01); *G09G 2300/0426* (2013.01); *G09G 2300/0852* (2013.01); *G09G 2300/0861* (2013.01)

(58) Field of Classification Search
CPC ......... G09G 3/3233; G09G 2300/0426; G09G 2300/0852; G09G 2300/0861
See application file for complete search history.

(56) References Cited

U.S. PATENT DOCUMENTS

2004/0246209 A1 12/2004 Sung
2007/0139314 A1* 6/2007 Park .................... G09G 3/3233 345/76

(Continued)

FOREIGN PATENT DOCUMENTS

CN 112542126 A 3/2021
CN 113196160 A 7/2021

(Continued)

OTHER PUBLICATIONS

The First Office Action for CN Application No. 202411136529.6, dated Aug. 23, 2025, 24 pages.

(Continued)

*Primary Examiner* — Stephen G Sherman
(74) *Attorney, Agent, or Firm* — East IP P.C.

(57) ABSTRACT

The present application discloses a display panel and a display apparatus. The display panel includes a plurality of light-emitting elements and a plurality of pixel circuits. At least one of the light-emitting elements includes a first light-emitting element and a second light-emitting element in different light-emitting colors and the light-emitting elements include a first pixel circuit configured to drive the first light-emitting element and including a first target transistor, and a second pixel circuit configured to drive the second light-emitting element and including a second target transistor with a same function as that of the first target transistor and a different width-to-length ratio from that of the first target transistor.

17 Claims, 14 Drawing Sheets

(56) References Cited

U.S. PATENT DOCUMENTS

| | | | | |
|---|---|---|---|---|
| 2007/0296662 | A1* | 12/2007 | Lee | G09G 3/3677 345/87 |
| 2012/0313923 | A1* | 12/2012 | Minami | G09G 3/3233 345/212 |
| 2018/0293929 | A1* | 10/2018 | Shigeta | G09G 3/3233 |
| 2019/0259327 | A1* | 8/2019 | Li | G09G 3/3233 |
| 2020/0111403 | A1 | 4/2020 | Kim et al. | |
| 2020/0394953 | A1 | 12/2020 | Kim et al. | |
| 2024/0013723 | A1 | 1/2024 | Zhai | |

FOREIGN PATENT DOCUMENTS

| | | | |
|---|---|---|---|
| CN | 114937436 | A | 8/2022 |
| CN | 117012145 | A | 11/2023 |
| CN | 117746787 | A | 3/2024 |
| CN | 118098134 | A | 5/2024 |
| EP | 4089740 | A1 | 11/2022 |

OTHER PUBLICATIONS

The Extended European Search Report for EP Application No. 25196663.6, dated Oct. 29, 2025, 26 pages.

* cited by examiner

DISPLAY PANEL COMPRISING PIXEL CIRCUIT AND DISPLAY APPARATUS

CROSS-REFERENCE TO RELATED APPLICATION

This application claims priority to Chinese Patent Application No. 202411136529.6, filed on Aug. 19, 2024, which is hereby incorporated by reference in its entirety.

TECHNICAL FIELD

The present application relates to the field of display technology, and specifically to a display panel and a display apparatus.

BACKGROUND

With the development of display technology, the application of display panels is becoming more and more common, and users have more and more requirements on the display quality of display panels. In order to meet the requirements of higher definition, the resolution of display panels is getting higher and higher.

In order to meet the driving requirements of high-resolution display panels, such as micro Light-emitting Diode (Micro LED) or organic Light-emitting Diode (Organic LED) display panels, a pixel circuit combining pulse amplitude modulation (PAM) and pulse width modulation (PWM) is used to control the intensity and duration of the driving current to control the light-emitting state of the light-emitting element.

In a pixel circuit combining PAM and PWM, how to optimize the layout design of the pixel circuit is an important issue faced by those skilled in the art.

SUMMARY

Embodiments of the present application provide a display panel and a display apparatus which can optimize the layout design of the pixel circuit.

In a first aspect, embodiments of the present application provide a display panel including a plurality of light-emitting elements and a plurality of pixel circuits. At least one of the light-emitting elements includes a first light-emitting element and a second light-emitting element in different light-emitting colors and the light-emitting elements include a first pixel circuit configured to drive the first light-emitting element and comprising a first target transistor, and a second pixel circuit configured to drive the second light-emitting element and comprising a second target transistor with a same function as that of the first target transistor and a different width-to-length ratio from that of the first target transistor.

In a second aspect, embodiments of the present application provide a display apparatus including the display panel in the first aspect.

BRIEF DESCRIPTION OF THE DRAWINGS

Other features, objects and advantages of the present application will become more apparent by reading the following detailed description of non-limiting embodiments with reference to the accompanying drawings, in which the same or similar reference numerals represent the same or similar features and the accompanying drawings are not drawn to scale.

PARTIAL REFERENCE NUMERALS

Figure 1:
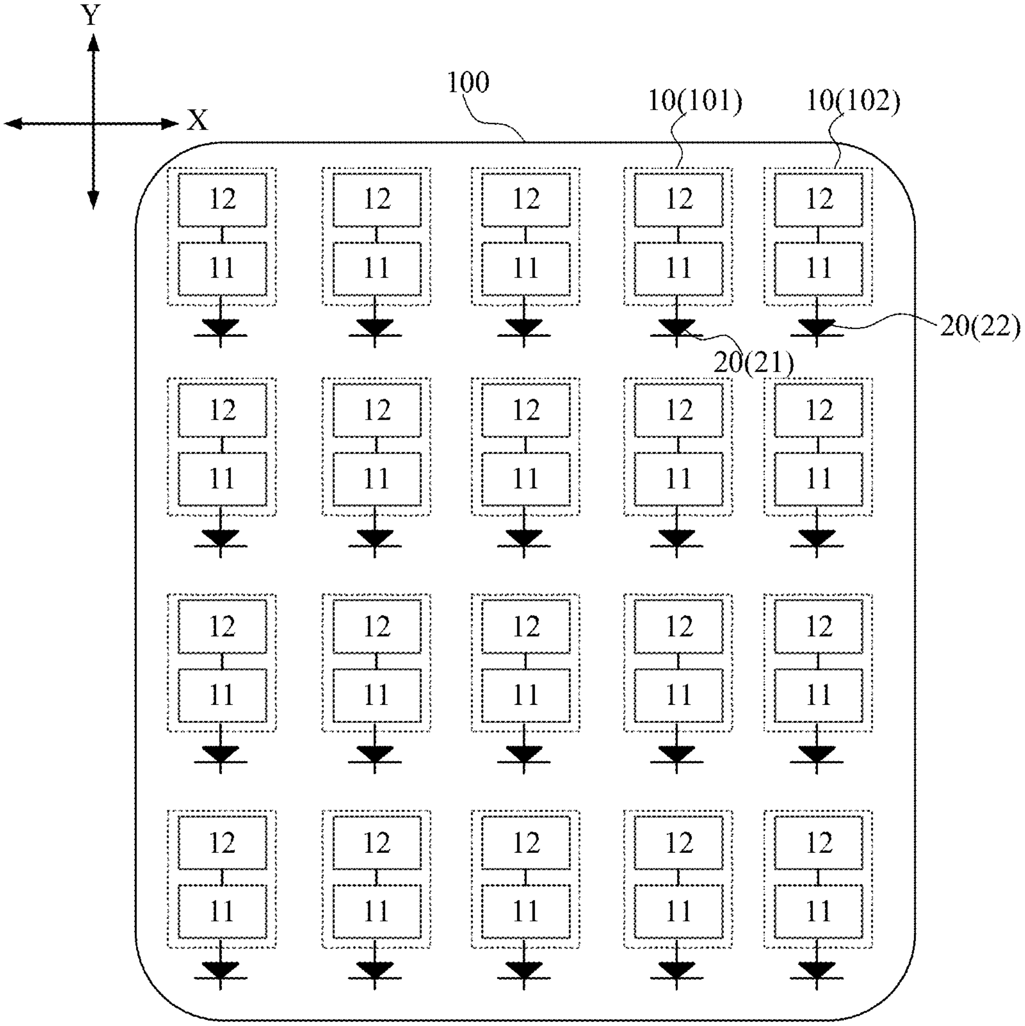
FIG. 1 is a schematic view of a display panel according to an embodiment of the present application.

100—Display panel;
10—Pixel circuit; 101—First pixel circuit; 102—Second pixel circuit; 103—Third pixel circuit;
20—Light-emitting element; 21—First light-emitting element; 22—Second light-emitting element; 23—Third light-emitting element;
11—Amplitude modulation subcircuit;
12—Pulse width modulation subcircuit;
01—First target transistor; 02—Second target transistor; 03—Third target transistor;
100—Display apparatus.

DETAILED DESCRIPTION

The features and exemplary embodiments of various aspects of the present application will be described in detail below. In order to make the purpose, technical solutions and advantages of the present application clearer, the present application will be further described in detail below in conjunction with the accompanying drawings and specific embodiments. It should be understood that the specific embodiments described herein are only configured to explain the present application and are not configured to limit the present application. For those skilled in the art, the present application can be implemented without the need for some of these specific details. The following description of the embodiments is only to provide a better understanding of the present application by illustrating the examples of the present application.

It should be noted that, in this article, relational terms such as first and second, etc. are only used to distinguish one entity or operation from another entity or operation, and do not necessarily require or imply any such actual relationship or order between these entities or operations. Moreover, the terms “include”, “comprise” or any other variants thereof are intended to cover non-exclusive inclusion, so that a process, method, article or device including a series of elements includes not only those elements, but also other elements not explicitly listed, or also includes elements inherent to such process, method, article or device. In the absence of further restrictions, the elements defined by the statement “include.” do not exclude the existence of other identical elements in the process, method, article or device including the elements.

It should be understood that when describing the structure of a component, when a layer or a region is referred to as being “on” or “over” another layer or region, it may mean that it is directly on the other layer or region, or that other layers or regions are included between it and the other layer or region. Furthermore, if the component is turned over, the layer or region will be “below” or “beneath” another layer or region.

It should be understood that the term “and/or” used in this article is only a description of the association relationship of associated objects, indicating that there can be three relationships. For example, A and/or B can represent: A exists alone, A and B exist at the same time, and B exists alone. In addition, the character “/” in this article generally indicates that the associated objects before and after are in an “or” relationship.

The term “connect” may mean “electrically connected” or “not electrically connected through an intermediate transistor”. The term “insulation” may mean “electrically insulating” or “electrically isolated”. The term “driving” may mean “controlling” or “operating”. The term “part” may mean “local”. The term “pattern” may mean “component”. The term “end” may mean “end segment” or “end edge”. The display panel may be a display device or a module/part of a display apparatus.

It is obvious to those skilled in the art that various modifications and changes can be made in this application without departing from the spirit or scope of this application. Therefore, this application is intended to cover modifications and changes of this application that fall within the scope of the corresponding claims (technical solutions claimed for protection) and their equivalents. It should be noted that the implementation methods provided in the embodiments of this application can be combined with each other without contradiction.

Embodiments of the present application provide a display panel and a display apparatus thereof. Embodiments of the display panel and the display apparatus will be described below in conjunction with the accompanying drawings.

As shown in FIG. 1, the display panel 100 includes a plurality of light-emitting elements 20 and a plurality of pixel circuits 10 connected to the pixel circuits 10 and configured to drive the light-emitting elements 20 to emit light, respectively.

The light-emitting element 20 may be a light-emitting element such as a micro LED or an OLED, and may be designed according to actual conditions during implementation. Optionally, the light-emitting element 20 may be an inorganic light-emitting element including a first electrode, a second electrode, and an inorganic semiconductor disposed between the first electrode and the second electrode.

Each of the pixel circuits 10 includes an amplitude modulation subcircuit 11 and a pulse width modulation subcircuit 12 connected to the amplitude modulation subcircuit 11.

The pixel circuit 10 generates a driving current under the control of the amplitude modulation subcircuit 11 and the pulse width modulation subcircuit 12. The amplitude modulation subcircuit 11 is configured to control the amplitude of the driving current, and the pulse width modulation subcircuit 12 is configured to adjust the pulse width of the voltage applied to the first electrode of the light-emitting element 20.

The pulse width modulation subcircuit 12 is configured to adjust the pulse width of the voltage applied to the first electrode of the light-emitting element 20, that is, the pulse width modulation subcircuit 12 is configured to adjust the actual emission period of the driving current applied to the light-emitting element 20, and at the same time, the driving current applied to the light-emitting element is maintained at a constant level to adjust the grayscale or brightness displayed by the light-emitting element, rather than adjusting the grayscale or brightness displayed by the light-emitting element only by adjusting the magnitude of the driving current applied to the light-emitting element. Therefore, the amplitude modulation subcircuit 11 can provide the driving current to the light-emitting element to enable the light-emitting element to be driven at the optimal luminous efficiency, and adjust the grayscale or brightness displayed by the light-emitting element by adjusting the light emission duty ratio (that is, the emission period of the light-emitting element) of the light-emitting element through the pulse width modulation subcircuit 12.

The pixel circuits 10 includes a first pixel circuit 101 and a second pixel circuit 102, and the light-emitting element 20 includes a first light-emitting element 21 and a second light-emitting element 22, the first pixel circuit 101 being configured to drive the first light-emitting element 21, and the second pixel circuit 102 being configured to drive the second light-emitting element 22. The light-emitting color of the first light-emitting element 21 is different from that of the second light-emitting element 22. For example, the light-emitting color of the first light-emitting element 21 is any one of red, blue, and green, and the light-emitting color of the second light-emitting element 22 is another one of red, blue, and green.

Figure 2:
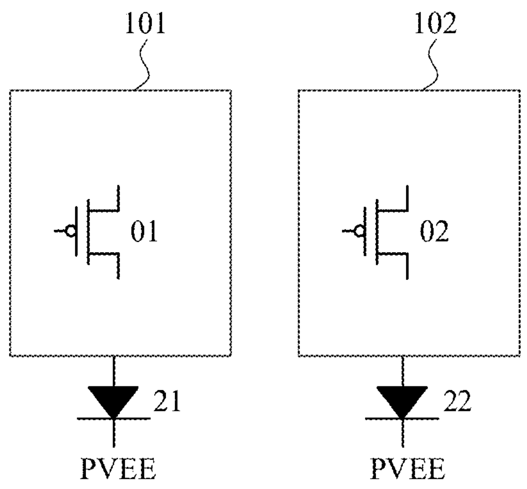
FIG. 2 is a schematic view of a pixel circuit in a display panel according to an embodiment of the present application.

As shown in FIG. 2, the first pixel circuit 101 includes a first target transistor 01, and the second pixel circuit 102 includes a second target transistor 02. The first target transistor 01 and the second target transistor 02 have the same functions, the width-to-length ratio of the first target transistor 01 is not equal to that of the second target transistor 02.

The equivalent circuit structures of the first pixel circuit and the second pixel circuit may be the same, in other words, the number of devices and the connection relationship between the various devices in the first pixel circuit and the second pixel circuit are the same. The difference between the first pixel circuit and the second pixel circuit includes: the sizes of target transistors with the same function are different, and the two are respectively configured to drive light-emitting elements in different luminous colors.

For the transistor itself, it can be turned on or turned off. The function of the transistor in the pixel circuit is determined by its connection relationship. From this perspective, the first target transistor 01 and the second target transistor 02 have the same function, which may include: the connection relationship of the two transistors in the first pixel circuit and the second pixel circuit are the same.

The devices of the pixel circuit includes multiple transistors. In the same pixel circuit, different transistors have different functions. Specifically, the amplitude modulation subcircuit 11 and the pulse width modulation subcircuit 12 each include transistors. Taking the amplitude modulation subcircuit 11 as an example, the amplitude modulation subcircuit 11 includes a driving transistor, a light-emitting control transistor, etc. The function of the driving transistor is to generate a driving current, and the function of the light-emitting control transistor is to control the light-emitting element to emit light.

It can be understood that when the first target transistor is a transistor in the amplitude modulation subcircuit of the first pixel circuit, the second target transistor is a transistor in the amplitude modulation subcircuit of the second pixel circuit; when the first target transistor is a transistor in the pulse width modulation subcircuit of the first pixel circuit, the second target transistor is a transistor in the pulse width modulation subcircuit of the second pixel circuit.

As an example, the first target transistor is a driving transistor of the amplitude modulation subcircuit of the first pixel circuit, and correspondingly, the second target transistor is a driving transistor of the amplitude modulation subcircuit of the second pixel circuit.

As another example, the first target transistor is the driving transistor of the pulse width modulation subcircuit of the first pixel circuit, and correspondingly, the second target transistor is the driving transistor of the pulse width modulation subcircuit of the second pixel circuit.

As another example, the first target transistor is a light-emitting control transistor of the amplitude modulation subcircuit of the first pixel circuit, and correspondingly, the second target transistor is the light-emitting control transistor of an amplitude modulation subcircuit of a second pixel circuit.

It should be noted that, in this article, the “width-to-length ratio” of a transistor is the ratio of the transistor channel length to its channel width.

The larger the width-to-length ratio of the transistor, the stronger the driving capability, and the larger the required layout area. The smaller the “width-to-length ratio” of the transistor, and the smaller the required layout area.

The first light-emitting element 21 and the second light-emitting element 22 have different characteristics and different driving requirements. For example, the first light-emitting element requires a large driving capability and while the second light-emitting element requires a small driving capability. The width-to-length ratio of the first target transistor is greater than that of the second target transistor, that is, the width-to-length ratio of the second target transistor can be reduced, which can optimize the layout design and reduce the layout area occupied by the second pixel circuit without affecting the driving of the second light-emitting element.

According to the display panel provided in the embodiment of the present application, the first pixel circuit is configured to drive the first light-emitting element, and the second pixel circuit is configured to drive the second light-emitting element. The sizes of transistors with the same functions in the first pixel circuit and the second pixel circuit are designed to differentiate. In this way, for the light-emitting elements that requires small driving capabilities, the width-to-length ratio of the target transistor in its pixel circuit can be reduced, which can optimize the layout design and reduce the layout area occupied by the pixel circuit, and is conducive to setting more pixel circuits in a limited area, thereby improving the pixel density without affecting the driving of the light-emitting elements.

Figure 3:
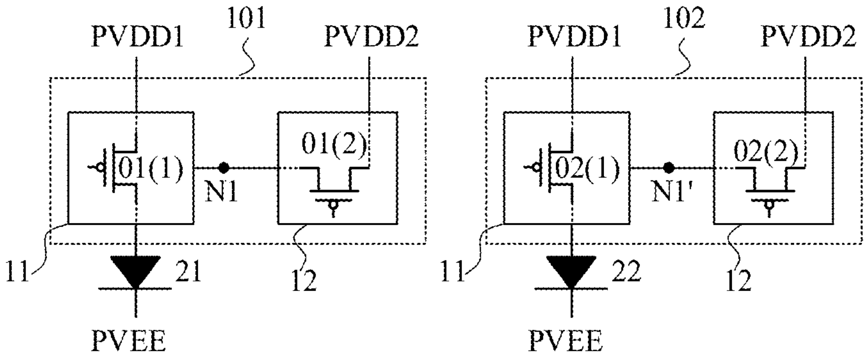
FIG. 3 is a schematic view of a pixel circuit in a display panel according to another embodiment of the present application.

In some examples, the first target transistor is connected in series to the path of the driving current of the first pixel circuit, and the second target transistor is connected in series to the path of the driving current of the second pixel circuit. As shown in FIG. 3, the pixel circuit includes an amplitude modulation subcircuit 11 and a pulse width modulation subcircuit 12. The amplitude modulation subcircuit 11 and the pulse width modulation subcircuit 12 in the first pixel circuit 101 are connected to the node N1, and the amplitude modulation subcircuit 11 and the pulse width modulation subcircuit 12 in the second pixel circuit 102 are connected to the node N1', the amplitude modulation subcircuit 11 is connected to the first power supply terminal PVDD1, and the pulse width modulation subcircuit 12 is connected to the second power supply terminal PVDD2. The amplitude modulation subcircuit 11 and the pulse width modulation subcircuit 12 each have a path for the driving current. The path of the driving current of the amplitude modulation subcircuit 11 refers to a path between the first power supply terminal PVDD1 and the common power supply terminal PVEE. The path of the driving current of the pulse width modulation subcircuit 12 in the first pixel circuit 101 refers to a path between the second power supply terminal PVDD2 and the node N1. The path of the driving current of the pulse width modulation subcircuit 12 in the second pixel circuit 102 refers to a path between the second power supply terminal PVDD2 and the node N1'.

For example, as shown in FIG. 3, a first first target transistor 01(1) is connected in series on a path between the first power terminal PVDD1 of the first pixel circuit 101 and the common power terminal PVEE, and a first second target transistor 02(1) is connected in series on a path between the first power terminal PVDD1 of the second pixel circuit 101 and the common power terminal PVEE. The first first target transistor 01(1) and the first second target transistor 02(1) are the transistors with the same functions, and a width-to-length ratio of the first first target transistor 01(1) is different from that of the first second target transistor 02(1).

For another example, a second first target transistor 01(2) is connected in series on a path between a first power supply terminal PVDD1 and a node N1 of the first pixel circuit 101, and a second second target transistor 02(2) is connected in series on a path between a second power supply terminal PVDD2 and a node N1' of the second pixel circuit 102. The second first target transistor 01(2) and the second second target transistor 02(2) are the transistors with the same functions, and the width-to-length ratio of the second first target transistor 01(2) is different from that of the second second target transistor 02(2).

It should be noted that it is beneficial to improving the driving current of the amplitude modulation sub-circuit or the pulse width modulation subcircuit by increasing the width-to-length ratio of any transistor on the driving current path of the amplitude modulation sub-circuit or the pulse width modulation subcircuit. Therefore, for light-emitting elements that requires large driving capabilities, the width-to-length ratio of at least one transistor on the driving current path of the amplitude modulation sub-circuit and/or the pulse width modulation subcircuit can be increased.

It should further be noted that there are more than one first target transistors in embodiments in the present application, and similarly, there are more than one second target transistors, and the various embodiments mentioned in the present application may be arbitrarily combined without contradiction.

Figure 4:
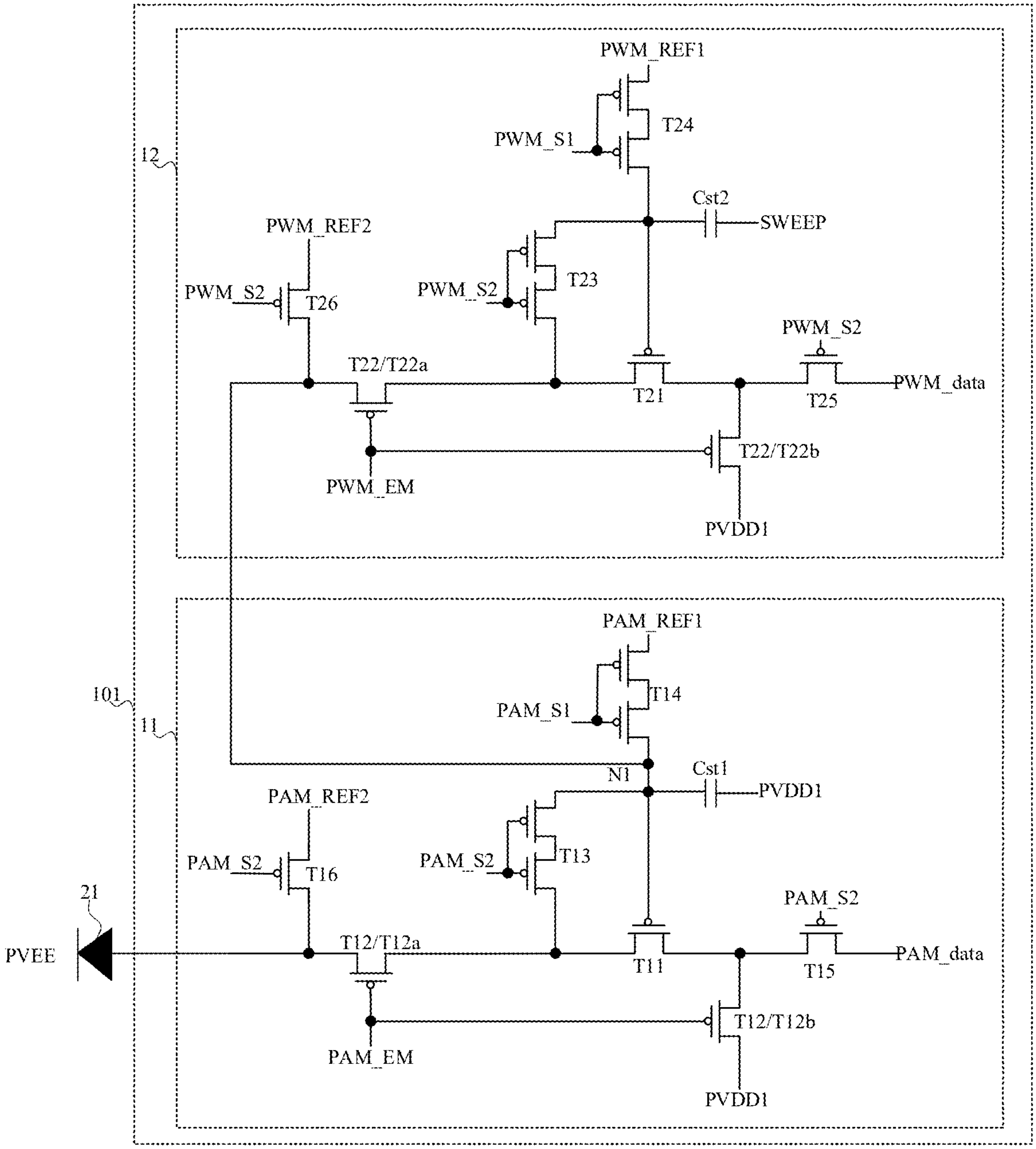
FIG. 4 is a schematic view of a first pixel circuit in a display panel according to an embodiment of the present application.
Figure 5:
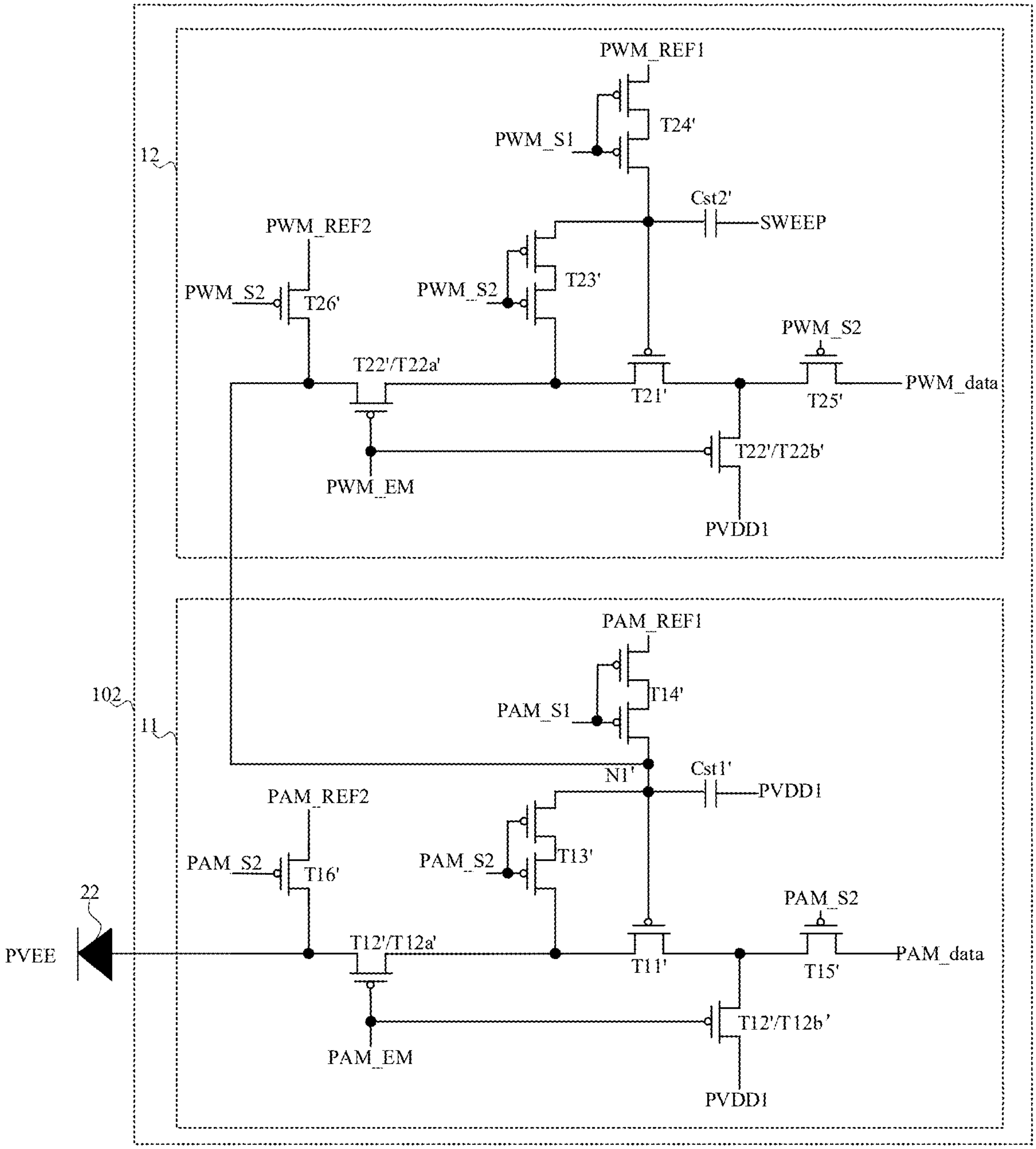
FIG. 5 is a schematic view of a second pixel circuit in a display panel according to an embodiment of the present application.

In some embodiments, referring to FIG. 4 and FIG. 5, the amplitude modulation subcircuit 11 of the first pixel circuit 101 includes a first driving transistor T11, the amplitude modulation subcircuit 11 of the second pixel circuit 102 includes a second driving transistor T11', the pulse width modulation subcircuit 12 of the first pixel circuit 101 includes a third driving transistor T21, and the pulse width modulation subcircuit 12 of the second pixel circuit 102 includes a fourth driving transistor T21'. The first driving transistor T11 and the second driving transistor T11' have the same function, and the third driving transistor T21 and the fourth driving transistor T21' have the same function.

The first target transistor includes a first driving transistor, the second target transistor includes a second driving transistor, the width-to-length ratio of the first driving transistor T11 is greater than that of the second driving transistor T11'; and/or the first target transistor includes a third driving transistor, the second target transistor includes a fourth driving transistor, and the width-to-length ratio of the third driving transistor T21 is greater than that of the fourth driving transistor T21'.

As an example, the width-to-length ratio of the first driving transistor T11 is greater than that of the second driving transistor T11', and the width-to-length ratio of the third driving transistor T21 is greater than that of the fourth driving transistor T21'.

As another example, the width-to-length ratio of the first driving transistor T11 is greater than that of the second driving transistor T11', and the width-to-length ratio of the third driving transistor T21 is equal to that of the fourth driving transistor T21'.

As yet another example, the width-to-length ratio of the first driving transistor T11 is equal to that of the second driving transistor T11', and the width-to-length ratio of the third driving transistor T21 is greater than that of the fourth driving transistor T21'.

The light-emitting elements in different colors have different requirements on the driving current, and the driving current is generated by the driving transistor in the pixel circuit. Therefore, in embodiments of the present application, the width-to-length ratios of the driving transistors corresponding to the light-emitting elements in different colors are set to be inconsistent, which can flexibly match with the current requirements of the light-emitting elements in different colors and reduce the layout area required for the driving transistor in the second pixel circuit, thereby optimizing the layout design.

It is understandable that the width-to-length ratio of the first driving transistor T11 is greater than that of the second driving transistor T11', and the width-to-length ratio of the third driving transistor T21 is greater than that of the fourth driving transistor T21'. The layout areas occupied by the second driving transistor T11' and the fourth driving transistor T21' can be adjusted in a smaller direction at the same time, which is more conducive to optimizing the layout design.

In some embodiments, the width-to-length ratio of the first driving transistor T11 in the first pixel circuit 101 is greater than that of the third driving transistor T21, and/or the width-to-length ratio of the second driving transistor T11' is greater than that of the fourth driving transistor T21'.

As an example, the width-to-length ratio of the first driving transistor T11 is greater than that of the third driving transistor T21, and the width-to-length ratio of the second driving transistor T11' is greater than that of the fourth driving transistor T21'.

As another example, the width-to-length ratio of the first driving transistor T11 is greater than that of the third driving transistor T21, and the width-to-length ratio of the second driving transistor T11' is equal to that of the fourth driving transistor T21'.

As yet another example, the width-to-length ratio of the first driving transistor T11 is equal to that of the third driving transistor T21, and the width-to-length ratio of the second driving transistor T11' is greater than that of the fourth driving transistor T21'.

The amplitude modulation subcircuit 11 provides a driving current for the light-emitting element to emit light. The pulse width modulation subcircuit 12 outputs a logic control signal, and the driving current of the pulse width modulation subcircuit 12 is relatively small. Therefore, the width-to-length ratio of the driving transistor in the amplitude modulation subcircuit 11 is relatively large relative to that of the driving transistor in the pulse width modulation subcircuit 12 to ensure the driving capability of the driving transistor in the amplitude modulation subcircuit 11.

It is understandable that the width-to-length ratio of the first driving transistor T11 is greater than that of the third driving transistor T21, and the width-to-length ratio of the second driving transistor T11' is greater than that of the fourth driving transistor T21'. The layout areas occupied by the third driving transistor T21 and the fourth driving transistor T21' can be adjusted in a smaller direction at the same time, which is more conducive to optimizing the layout design.

Optionally, the width-to-length ratio of the third driving transistor T21 is smaller than that of the second driving transistor T11', so as to ensure the driving capability of the second driving transistor T11' to the second light-emitting element.

In some embodiments, as shown in FIG. 4 and FIG. 5, the amplitude modulation subcircuit 11 in the first pixel circuit 101 includes a first light-emitting control transistor T12, the amplitude modulation subcircuit 11 in the second pixel circuit 102 includes a second light-emitting control transistor T12', the pulse width modulation subcircuit 12 of the first pixel circuit 101 includes a third light-emitting control transistor T22, and the pulse width modulation subcircuit 12 of the second pixel circuit 102 includes a fourth light-emitting control transistor T22'. The first light-emitting control transistor T12 and the second light-emitting control transistor T12' have the same function, and the third light-emitting control transistor T22 and the fourth light-emitting control transistor T22' have the same function.

The first target transistor includes a first light-emitting control transistor, the second target transistor includes a second light-emitting control transistor, and the width-to-length ratio of the first light-emitting control transistor T12 is greater than that of the second light-emitting control transistor T12', and/or the first target transistor includes a third light-emitting control transistor, the second target transistor includes a fourth light-emitting control transistor, and the width-to-length ratio of the third light-emitting control transistor T22 is greater than that of the fourth light-emitting control transistor T22'.

As an example, the width-to-length ratio of the first light-emitting control transistor T12 is greater than that of the second light-emitting control transistor T12', and the width-to-length ratio of the third light-emitting control transistor T22 is greater than that of the fourth light-emitting control transistor T22'.

As another example, the width-to-length ratio of the first light-emitting control transistor T12 is greater than that of the second light-emitting control transistor T12', and the aspect ratio of the third light-emitting control transistor T22 is equal to that of the fourth light-emitting control transistor T22'.

As another example, the width-to-length ratio of the first light-emitting control transistor T12 is equal to that of the second light-emitting control transistor T12', and the width-to-length ratio of the third light-emitting control transistor T22 is greater than that of the fourth light-emitting control transistor T22'.

In the first pixel circuit 101, the first light-emitting control transistor T12 and the first driving transistor T11 are connected in series to the current path of the amplitude modulation subcircuit 11, and the third light-emitting control transistor T22 and the third driving transistor T21 are connected in series to the current path of the pulse width modulation subcircuit 12.

In the second pixel circuit 102, the second light-emitting control transistor T12' and the second driving transistor T11' are connected in series to the current path of the amplitude modulation subcircuit 11, and the fourth light-emitting control transistor T22' and the fourth driving transistor T21' are connected in series to the current path of the pulse width modulation subcircuit 12.

The requirements of the light-emitting elements in different colors on the driving current are inconsistent, and the driving current is required to flow through the light-emitting control transistor. Therefore, in embodiments of the present application, the width-to-length ratios of the light-emitting control transistors corresponding to the light-emitting elements in different colors are set to be inconsistent, which can flexibly match with the requirements for the current by the light-emitting elements in different colors and reduce the layout area required for the light-emitting control transistors in the second pixel circuit, thereby optimizing the layout design.

As an example, the width-to-length ratio of the first driving transistor T11 is greater than that of the second driving transistor T11', the width-to-length ratio of the third driving transistor T21 is greater than that of the fourth driving transistor T21', the width-to-length ratio of the first light-emitting control transistor T12 is greater than that of the second light-emitting control transistor T12', and the width-to-length ratio of the third light-emitting control transistor T22 is greater than that of the fourth light-emitting control transistor T22'. The layout area occupied by more transistors can be adjusted in a smaller direction at the same time, which is more conducive to optimizing the layout design.

As shown in FIGS. 4 and 5, there are two first light-emitting control transistors, one of which is marked as T12*a*, and the other is marked as T12*b*; there are two third light-emitting control transistors T22, one of which is marked as T22*a*, and the other is marked as T22*b*; there are two second light-emitting control transistors T12', one of which is marked as T12*a'*, and the other is marked as T12*b'*; there are two fourth light-emitting control transistors T22', one of which is marked as T22*a'*, and the other is marked as T22*b'*.

The width-to-length ratio of the first light-emitting control transistor T12 is greater than that of the second light-emitting control transistor T12', including: the width-to-length ratio of the transistor T12*a* is greater than that of the transistor T12*a'*, and/or the width-to-length ratio of the transistor T12*b* is greater than that of the transistor T12*b'*.

For example, the width-to-length ratio of the first light-emitting control transistor T12 is greater than that of the second light-emitting control transistor T12', including: the width-to-length ratio of the transistor T12*a* is greater than that of the transistor T12*a'*, and the width-to-length ratio of the transistor T12*b* is greater than that of the transistor T12*b'*.

The width-to-length ratio of the third light-emitting control transistor T22 is greater than that of the fourth light-emitting control transistor T22', including: the width-to-length ratio of the transistor T22*a* is greater than that of the transistor T22*a'*, and/or the width-to-length ratio of the transistor T22*b* is greater than that of the transistor T22*b'*.

For example, the width-to-length ratio of the third light-emitting control transistor T22 is greater than the width-to-length ratio of the fourth light-emitting control transistor T22', including: the width-to-length ratio of the transistor T22*a* is greater than the width-to-length ratio of the transistor T22*a'*, and the width-to-length ratio of the transistor T22*b* is greater than the width-to-length ratio of the transistor T22*b'*.

In some embodiments, when the first pixel circuit 101 and the second pixel circuit 102 each include driving transistors and light-emitting control transistors, the width-to-length ratio of the first light-emitting control transistor T12 is greater than that of the first driving transistor T11, and/or, the width-to-length ratio of the second light-emitting control transistor T12' is greater than that of the second driving transistor T11', and/or, the width-to-length ratio of the third light-emitting control transistor T22 is greater than that of the third driving transistor T21, and/or, the width-to-length ratio of the fourth light-emitting control transistor T22' is greater than that of the fourth driving transistor T21'.

Exemplarily, as shown in FIG. 4 and FIG. 5, the first light-emitting control transistor T12 includes transistors T12*a* and T12*b*; the third light-emitting control transistor T22 includes transistors T22*a* and T22*b*; the second light-emitting control transistor T12' includes transistors T12*a'* and T12*b'*; the fourth light-emitting control transistor T22' includes transistors T22*a'* and T22*b'*.

The width-to-length ratio of the first light-emitting control transistor T12 is greater than that of the first driving transistor T11, including: the width-to-length ratios of the transistor T12*a* and the transistor T12*b* are both greater than that of the first driving transistor T11.

The width-to-length ratio of the second light-emitting control transistor T12' is greater than that of the second driving transistor T11', including: the width-to-length ratios of the transistor T12*a'* and the transistor T12*b'* are both greater than that of the second driving transistor T11'.

The width-to-length ratio of the third light-emitting control transistor T22 is greater than that of the third driving transistor T21, including: the width-to-length ratios of the transistor T22*a* and the transistor T22*b* are both greater than that of the third driving transistor T21.

The width-to-length ratio of the fourth light-emitting control transistor T22' is greater than that of the fourth driving transistor T21', including: the width-to-length ratios of the transistor T22*a*' and the transistor T22*b*' are both greater than that of the fourth driving transistor T21'.

In a plurality of transistors connected in series, the smaller the width-to-length ratio of the transistor, the greater the impedance. The transistor with greater impedance has greater current control accuracy, and the driving transistor is configured to regulate the current. In embodiments of the present application, in the driving transistor and the light-emitting control transistor connected in series, the width-to-length ratio of the driving transistor is set to be relatively small, which can improve the current control accuracy of the driving transistor while optimizing the layout design.

In some embodiments, as shown in FIGS. 4 and 5, the first light-emitting control transistor T12 includes a first light-emitting control sub-transistor T12*a* and a second light-emitting control sub-transistor T12*b*. The two ends of the first light-emitting control sub-transistor T12*a* are respectively connected to the first light-emitting element 21 and the second light-emitting control sub-transistor T12*b*, and the two ends of the second light-emitting control sub-transistor T12*b* are respectively connected to the first light-emitting control sub-transistor T12*a* and the first power supply terminal PVDD1. The first driving transistor T11 is connected between the first light-emitting control sub-transistor T12*a* and the second light-emitting control sub-transistor T12*b*. The width-to-length ratio of the first light-emitting control sub-transistor T12*a* is greater than that of the second light-emitting control sub-transistor T12*b*.

The gate of the first light-emitting control sub-transistor T12*a* and the gate of the second light-emitting control sub-transistor T12*b* are both connected to the light-emitting control signal PAM_EM, and the gate voltage of the first light-emitting control sub-transistor T12*a* is same as that of the second light-emitting control sub-transistor T12*b*. The first light-emitting control sub-transistor T12*a* is adjacent to the first light-emitting element 21, and the second light-emitting control sub-transistor T12*b* is adjacent to the first power supply terminal PVDD1. The source voltage of the first light-emitting control sub-transistor T12*a* is small, so the absolute value of the gate-source voltage difference |Vgs| of the first light-emitting control sub-transistor T12*a* is small. When the width-to-length ratio of the first light-emitting control sub-transistor T12*a* is large, the first light-emitting control sub-transistor T12*a* and the second light-emitting control sub-transistor T12*b* can both maintain a good conduction state.

Alternatively, the second light-emitting control transistor T12' includes a third light-emitting control sub-transistor T12*a*' and a fourth light-emitting control sub-transistor T12*b*', the two ends of the third light-emitting control sub-transistor T12*a*' are respectively connected to the second light-emitting element 22 and the fourth light-emitting control sub-transistor T12*b*', and the two ends of the fourth light-emitting control sub-transistor T12*b*' are respectively connected to the third light-emitting control sub-transistor T12*a*' and the first power supply terminal PVDD1. A second driving transistor T11' is connected between the third light-emitting control sub-transistor T12*a*' and the fourth light-emitting control sub-transistor T12*b*'. The width-to-length ratio of the third light-emitting control sub-transistor T12*a*' is greater than that of the fourth light-emitting control sub-transistor T12*b*'.

The gate of third light-emitting control sub-transistor T12*a*' and the gate of the fourth light-emitting control sub-transistor T12*b*' are both connected to the light-emitting control signal PAM_EM, and the gate voltages of the third light-emitting control sub-transistor T12*a*' and the fourth light-emitting control sub-transistor T12*b*' are the same. The third light-emitting control sub-transistor T12*a*' is adjacent to the second light-emitting element 22, and the fourth sub-light-emitting control transistor T12*b*' is adjacent to the first power supply terminal PVDD1. The source voltage of the third light-emitting control sub-transistor T12*a*' is relatively small, so the absolute value of the gate-source voltage difference |Vgs| of the third light-emitting control sub-transistor T12*a*' is small. When the width-to-length ratio of the third light-emitting control sub-transistor T12*a*' is great, the third light-emitting control sub-transistor T12*a*' and the fourth light-emitting control sub-transistor T12*b*' can both maintain a good conduction state.

As an example, the width-to-length ratio of the first emitting control sub-transistor T12*a* is greater than that of the second emitting control sub-transistor T12*b*, and the width-to-length ratio of the third emitting control sub-transistor T12*a*' is greater than that of the fourth emitting control sub-transistor T12*b*'.

As another example, the width-to-length ratio of the first emitting control sub-transistor T12*a* is greater than that of the second emitting control sub-transistor T12*b*, and the width-to-length ratio of the third emitting control sub-transistor T12*a*' is equal to that of the fourth emitting control sub-transistor T12*b*'.

As an example, the width-to-length ratio of the first emitting control sub-transistor T12*a* is equal to that of the second emitting control sub-transistor T12*b*, and the width-to-length ratio of the third emitting control sub-transistor T12*a*' is greater than that of the fourth emitting control sub-transistor T12*b*'.

Exemplarily, as shown in FIGS. 4 and 5, the third light-emitting control transistor T22 includes a fifth light-emitting control sub-transistor T22*a* and a sixth light-emitting control sub-transistor T22*b*, the fifth light-emitting control sub-transistor T22*a* is connected in series to the sixth light-emitting control sub-transistor T22*b*, and a third driving transistor T21 is connected between the fifth light-emitting control sub-transistor T22*a* and the sixth light-emitting control sub-transistor T22*b*. Exemplarily, the width-to-length ratio of the fifth light-emitting control sub-transistor T22*a* is equal to that of the sixth light-emitting control sub-transistor T22*b*.

The fourth light-emitting control transistor T22' includes a seventh light-emitting control sub-transistor T22*a*' and an eighth light-emitting control sub-transistor T22*b*', the seventh light-emitting control sub-transistor T22*a*' is connected in series to the eighth light-emitting control sub-transistor T22*b*', and a fourth driving transistor T21' is connected between the seventh light-emitting control sub-transistor T22*a*' and the eighth light-emitting control sub-transistor T22*b*'. Exemplarily, the width-to-length ratio of the seventh light-emitting control sub-transistor T22*a*' is equal to that of the eighth light-emitting control sub-transistor T22*b*'.

The driving current in the pulse width modulation subcircuit 12 is relatively small, so the width-to-length ratios of the two light-emitting control transistors in the pulse width modulation subcircuit 12 may be the same.

In some embodiments, referring to FIGS. 4 and 5, the amplitude modulation subcircuit 11 of the first pixel circuit 101 includes a first driving transistor T11, the amplitude modulation subcircuit 11 in the second pixel circuit 102 includes a second driving transistor T11', the pulse width modulation subcircuit 12 of the first pixel circuit 101 includes a third driving transistor T21, and the pulse width modulation subcircuit 12 of the second pixel circuit 102 includes a fourth driving transistor T21'. The amplitude modulation subcircuit 11 of the first pixel circuit 101 includes a first light-emitting control transistor T12, and the amplitude modulation subcircuit 11 of the second pixel circuit 102 includes a second light-emitting control transistor T12'.

The absolute value of the difference between the width-to-length ratio of the first driving transistor T11 and that of the second driving transistor T11' is $|\Delta A1|$, the absolute value of the difference between the width-to-length ratio of the first light-emitting control transistor T12 and that of the second light-emitting control transistor T12' is $|\Delta A2|$, and the absolute value of the difference between the width-to-length ratio of the third driving transistor T21 and that of the fourth driving transistor T21' is $|\Delta A3|$, where $|\Delta A2|>|\Delta A1|>|\Delta A3|$.

The width-to-length ratio of the first driving transistor T11 is greater than that of the second driving transistor T11', and the width-to-length ratio of the first driving transistor T11 and the that of the second driving transistor T11' are positive numbers. The same is true for other aspects, which will not be described one by one.

Exemplarily, the first light-emitting control transistor T12 includes a first light-emitting control sub-transistor T12*a* and a second light-emitting control sub-transistor T12*b*, the second light-emitting control transistor T12' includes a third light-emitting control sub-transistor T12*a'* and a fourth light-emitting control sub-transistor T12*b'*, the absolute value of the difference between the width-to-length ratio of the first light-emitting control sub-transistor T12*a* and that of the third light-emitting control sub-transistor T12*a'* is $|\Delta A21|$, the absolute value of the difference between the width-to-length ratio of the second light-emitting control sub-transistor T12*b* and that of the fourth light-emitting control sub-transistor T12*b'* is $|\Delta A22|$, $[\Delta A21]=|\Delta A22|-|\Delta A2|$.

Exemplarily, the third light-emitting control transistor T22 includes a fifth light-emitting control sub-transistor T22*a* and a sixth light-emitting control sub-transistor T22*b*; the fourth light-emitting control transistor T22' includes a seventh light-emitting control sub-transistor T22*a'* and an eighth light-emitting control sub-transistor T22*b'*; the absolute value of the difference between the width-to-length ratio of the fifth light-emitting control sub-transistor T22*a* and that of the seventh light-emitting control sub-transistor T22*a'* is $|\Delta A23|$; the absolute value of the difference between the width-to-length ratio of the sixth light-emitting control sub-transistor T22*b* and that of the eighth light-emitting control sub-transistor T22*b'* is $|\Delta A24|$, where $|\Delta A23|=|\Delta A24|$.

For example, $|\Delta A23|=|\Delta A24|>|\Delta A3|$.

For example, $|\Delta A23|=|\Delta A24|=|\Delta A2|$.

As introduced above, in the same modulation subcircuit, the width-to-length ratio of the light-emitting transistor is greater than that of the driving transistor; in the same pixel circuit, the width-to-length ratio of the driving transistor in the amplitude modulation sub-circuit is greater than that of the driving transistor in the pulse width modulation subcircuit; the width-to-length ratio of the driving transistor in the first pixel circuit is greater than that of the driving transistor in the second pixel circuit. By setting $|\Delta A2|>|\Delta A1|>|\Delta A3|$, the difference between each two can be increased while meeting the above size relationship, so that the performance of each pixel circuit is more in line with the requirements of the light-emitting element.

In some embodiments, as shown in FIG. 4 and FIG. 5, the amplitude modulation subcircuit 11 of the first pixel circuit 101 includes a first storage capacitor Cst1; the amplitude modulation subcircuit 11 in the second pixel circuit 102 includes a second storage capacitor Cst1'; the pulse width modulation subcircuit 12 of the first pixel circuit 101 includes a third storage capacitor Cst2; the pulse width modulation subcircuit 12 in the second pixel circuit 102 includes a fourth storage capacitor Cst2'. The two ends of the first storage capacitor Cst1 are respectively connected to the gate of the first driving transistor T11 and the first power supply terminal PVDD1; the two ends of the second storage capacitor Cst1' are respectively connected to the gate of the second driving transistor T11' and the first power supply terminal PVDD1; the two ends of the third storage capacitor Cst2 are respectively connected to the third driving transistor T21 and the sweep signal terminal SWEEP; the two ends of the fourth storage capacitor Cst2' are respectively connected to the fourth driving transistor T21' and the sweep signal terminal SWEEP.

The capacitance value of the first storage capacitor Cst1 is greater than that of the second storage capacitor Cst1', and/or the capacitance value of the third storage capacitor Cst2 is greater than that of the fourth storage capacitor Cst2'.

As an example, the capacitance value of the first storage capacitor Cst1 is greater than that of the second storage capacitor Cst1', and the capacitance value of the third storage capacitor Cst2 is greater than that of the fourth storage capacitor Cst2'.

As another example, the capacitance value of the first storage capacitor Cst1 is greater than that of the second storage capacitor Cst1', and the capacitance value of the third storage capacitor Cst2 is equal to that of the fourth storage capacitor Cst2'.

As an example, the capacitance value of the first storage capacitor Cst1 is equal to that of the second storage capacitor Cst1', and the capacitance value of the third storage capacitor Cst2 is greater than that of the fourth storage capacitor Cst2'.

Exemplarily, the capacitance of the storage capacitor may be adjusted by changing the plate area of the storage capacitor.

The light-emitting elements in different colors have different requirements on driving current, and the driving current is stabilized by the storage capacitor in the pixel circuit. Therefore, in embodiments of the present application, the capacitance values of the storage capacitors corresponding to the light-emitting elements in different colors are set to be inconsistent, which can flexibly match with the storage requirements of the light-emitting elements in different colors and reduce the layout area required for the storage capacitor in the second pixel circuit, thereby optimizing the layout design.

For example, the width-to-length ratio of the first driving transistor T11 is greater than that of the second driving transistor T11', and the width-to-length ratio of the first light-emitting control transistor T12 is greater than that of the second light-emitting control transistor T12', and the capacitance value of the first storage capacitor Cst1 is greater than that of the second storage capacitor Cst1'.

For another example, the width-to-length ratio of the third driving transistor T21 is greater than that of the fourth driving transistor T21', the width-to-length ratio of the third light-emitting control transistor T22 is greater than that of the fourth light-emitting control transistor T22', and the capacitance value of the third storage capacitor Cst2 is equal to that of the fourth storage capacitor Cst2'.

In some embodiments, the difference between the capacitance of the first storage capacitor Cst1 and the capacitance of the second storage capacitor Cst1' is ΔC1, and the difference between the capacitance of the third storage capacitor Cst2 and the capacitance of the fourth storage capacitor Cst2' is ΔC2, where ΔC1>ΔC2.

The first storage capacitor Cst1 and the second storage capacitor Cst1' belong to the amplitude modulation subcircuit, the third storage capacitor Cst2 and the fourth storage capacitor Cst2' belong to the pulse width modulation subcircuit, the driving current of the amplitude modulation subcircuit is larger than the driving current of the pulse width modulation subcircuit, so the storage capacitor of the amplitude modulation subcircuit needs to be relatively larger. In the embodiment of the present application, by setting ΔC1>ΔC2, the performance of each pixel circuit can be more in line with the requirements of the light-emitting element while complying with the above-mentioned size relationship.

Figure 6:
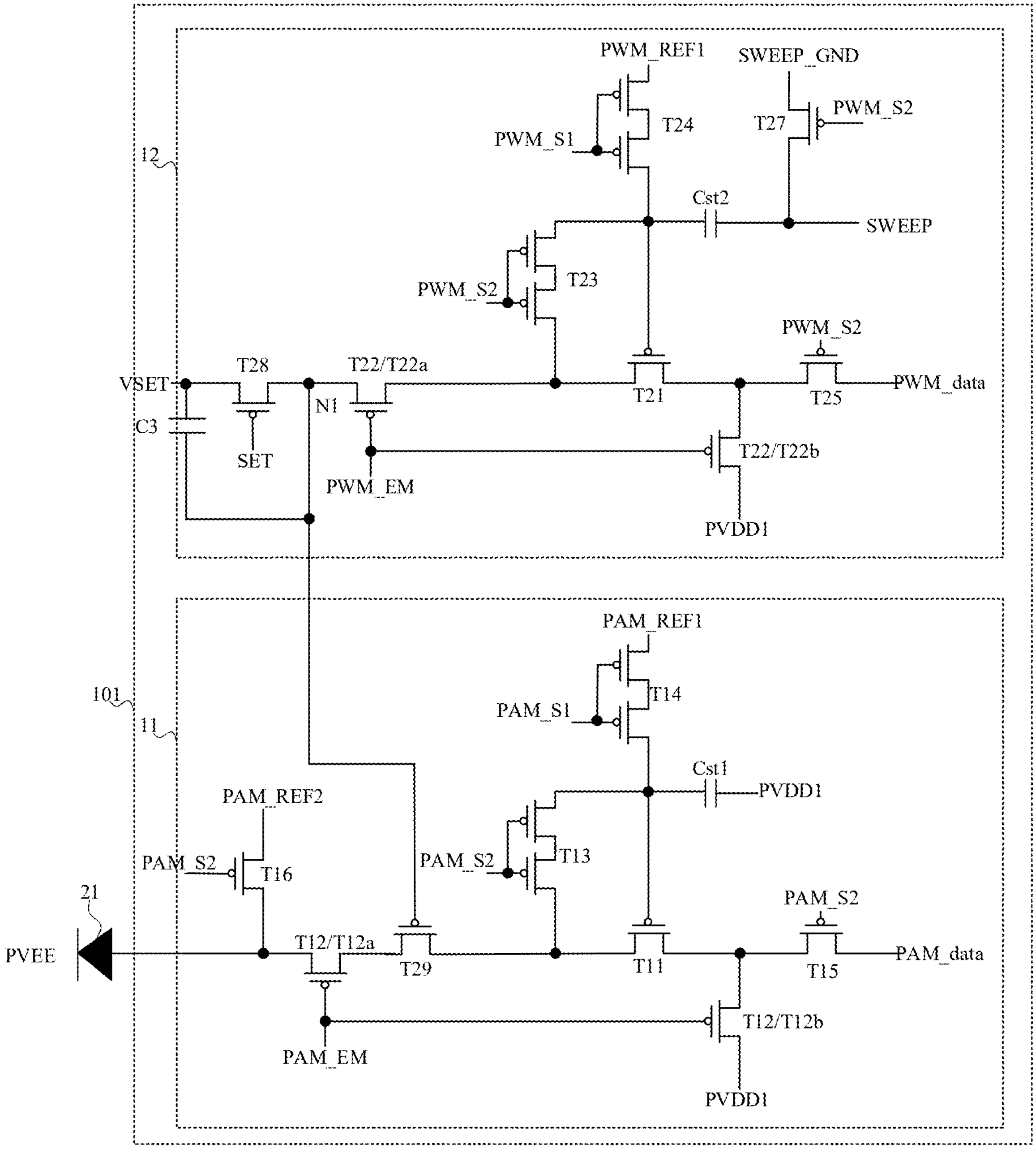
FIG. 6 is a schematic view of a first pixel circuit in a display panel according to another embodiment of the present application.
Figure 7:
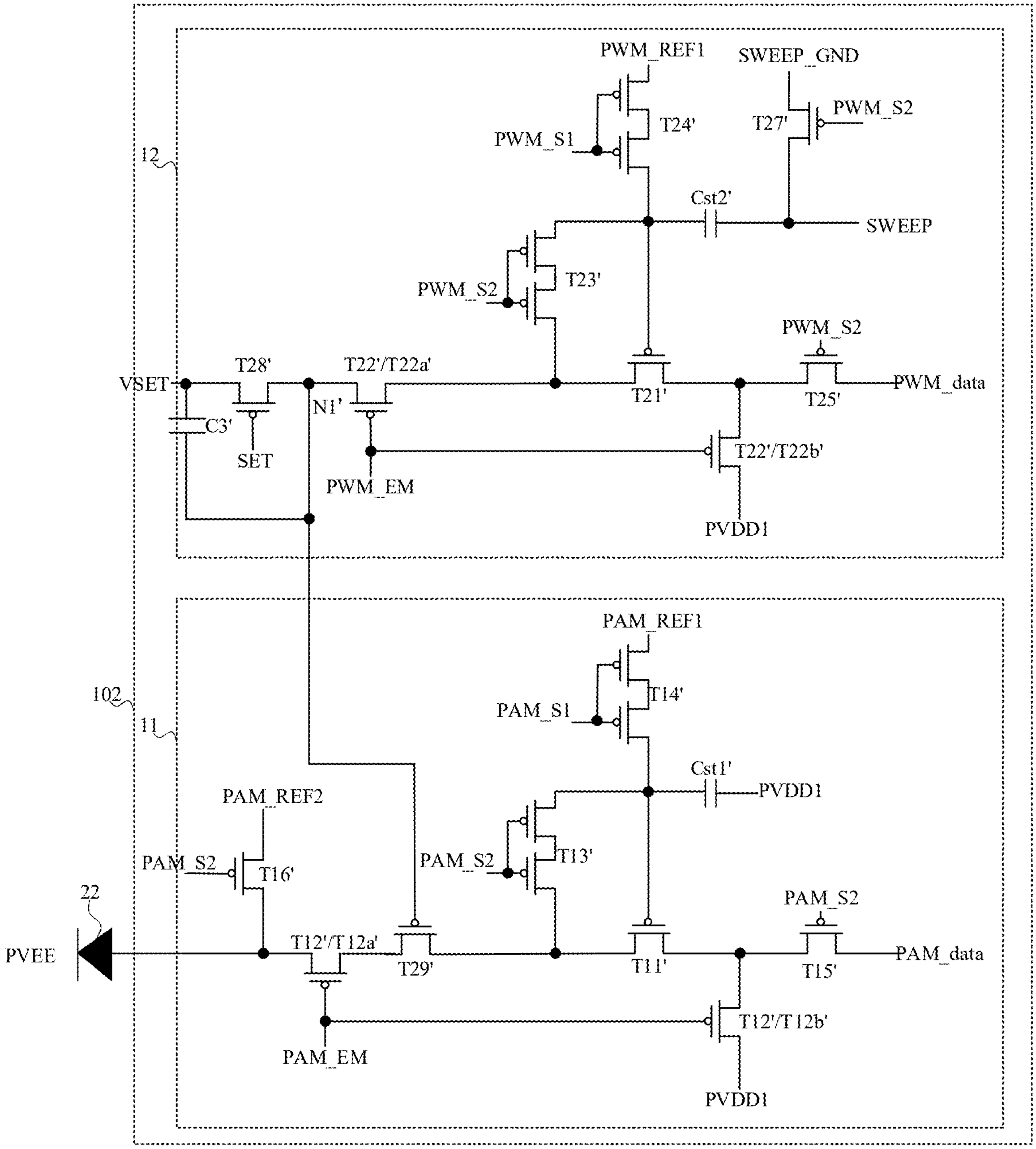
FIG. 7 is a schematic view of a second pixel circuit in a display panel according to another embodiment of the present application.

In some embodiments, as shown in FIGS. 6 and 7, the amplitude modulation subcircuit 11 of the first pixel circuit 101 includes a first control transistor T29, and the pulse width modulation subcircuit 12 of the first pixel circuit 101 is connected to the gate of the first control transistor T29. The first control transistor T29 is connected in series to the driving current path of the amplitude modulation subcircuit 11; for example, the first control transistor T29 is connected between the first driving transistor T11 and the first light-emitting element 21.

The amplitude modulation subcircuit 11 in the second pixel circuit 102 includes a second control transistor T29', and the pulse width modulation subcircuit 12 of the second pixel circuit 102 is connected to the gate of the second control transistor T29'. The second control transistor T29' is connected in series to the driving current path of the amplitude modulation subcircuit 11; for example, the second control transistor T29' is connected between the second driving transistor T11' and the second light-emitting element 22.

The first target transistor includes a first control transistor T29, and the second target transistor includes a second control transistor T29', and the width-to-length ratio of the first control transistor T29 is greater than that of the second control transistor T29'.

The requirements of the light-emitting elements in different colors on the driving current are inconsistent, and the driving current is required to flow through the control transistor. Therefore, in embodiments of the present application, the width-to-length ratios of the control transistors corresponding to the light-emitting elements in different colors are set to be inconsistent, which can flexibly match with the requirements of the light-emitting elements in different colors on current and reduce the layout area required for the control transistor in the second pixel circuit, thereby optimizing the layout design.

In some embodiments, The ratio of the width-to-length ratio of the first driving transistor T11 to that of the second driving transistor T11' is B1, the ratio of the width-to-length ratio of the third driving transistor T21 to that of the fourth driving transistor T21' is B2, and the ratio of the width-to-length ratio of the first control transistor T29 to that of the second control transistor T29' is B3; where B3=B1, or B3=B2.

The first control transistor T29 is connected in series to the first driving transistor T11, and the second control transistor T29' is connected in series to the second driving transistor T11'. When B3=B1, the control transistor and the driving transistor that are connected in series can be matched with each other, thereby optimizing the performance of the pixel circuit.

The driving of the first driving transistor T11 to the first light-emitting element is controlled by the third driving transistor T21 and the first control transistor T29, and the driving of the second driving transistor T11' to the second light-emitting element is controlled by the fourth driving transistor T21' and the second control transistor T29'. Therefore, from the control perspective, when B3=B2, the two transistors controlling the same driving transistor can be matched with each other, thereby optimizing the performance of the pixel circuit.

In some embodiments, as shown in FIGS. 6 and 7, the pulse width modulation subcircuit 12 of the first pixel circuit 101 includes a first control capacitor C3 connected to the gate of the first control transistor T29. The first control capacitor C3 and the transistor T28 are connected in parallel between the node N1 and the reset signal terminal VSET. The node N1 is connected to the gate of the first control transistor T29. The first control capacitor C3 can control the state of the first control transistor T29.

The pulse width modulation subcircuit 12 of the second pixel circuit 102 includes a second control capacitor C3' connected to the gate of the second control transistor T29'. The second control capacitor C3' and the transistor T28' are connected in parallel between the node N1' and the reset signal terminal VSET. The node N1' is connected to the gate of the second control transistor T29'. The second control capacitor C3' is capable f controlling the state of the second control transistor T29'.

When the width-to-length ratio of the first control transistor T29 is greater than that of the second control transistor T29', the capacitance value of the first control capacitor C3 is greater than that of the second control capacitor C3'. In this way, the interconnected control capacitor and the control transistor are matched with each other, so that both the first control transistor T29 and the second control transistor T29' can be effectively controlled.

Figure 8:
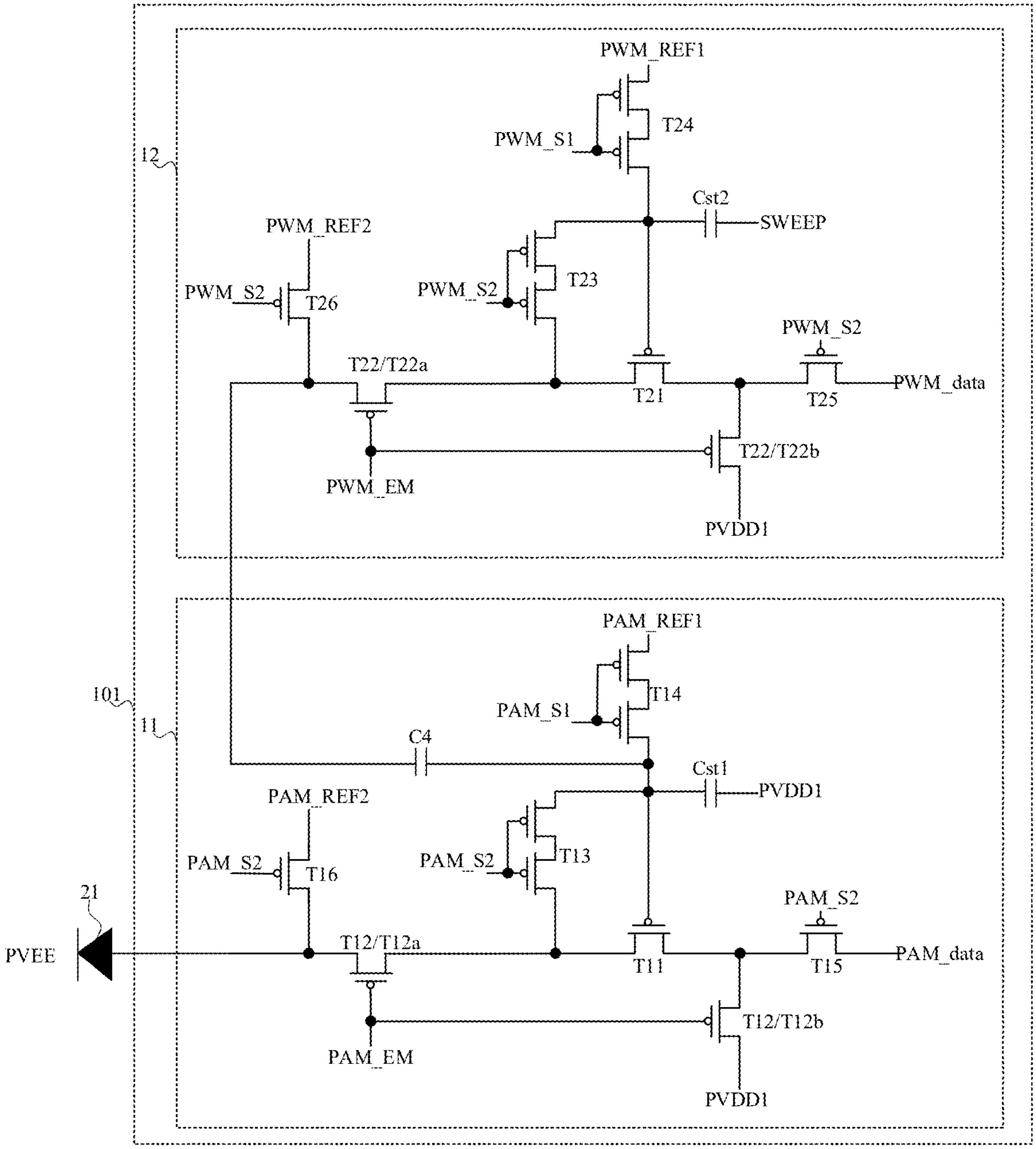
FIG. 8 is a schematic view of a first pixel circuit in a display panel according to yet another embodiment of the present application.
Figure 9:
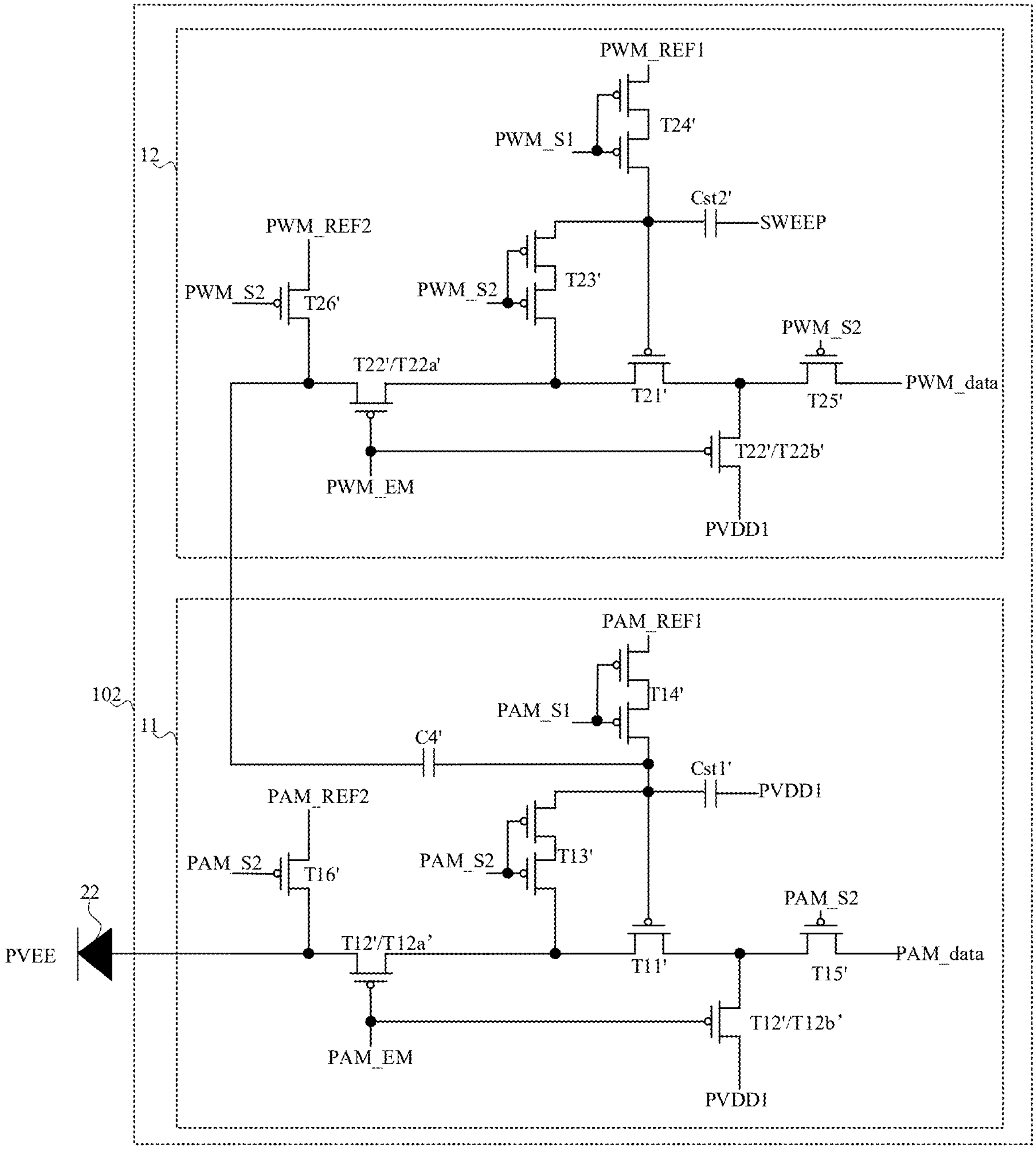
FIG. 9 is a schematic view of a second pixel circuit in a display panel according to yet another embodiment of the present application.

It should be noted that the structures of the first pixel circuit and the second pixel circuit in the present application are not limited to the structures shown in FIGS. 4 to 7, and the embodiments in the present application is also applicable to pixel circuits of other structures. As an example, as shown in FIGS. 8 and 9, the first pixel circuit 101 may further include a first connection capacitor C4, and in the first pixel circuit 101, the pulse width modulation subcircuit 12 is connected to the amplitude modulation subcircuit 11 through the first connection capacitor C4. The second pixel circuit 102 may further include a second connection capacitor C4', and in the second pixel circuit 102, the pulse width modulation subcircuit 12 is connected to the amplitude modulation subcircuit 11 through the second connection capacitor C4'.

In some embodiments, the first light-emitting element 21 includes a red light-emitting element, and the second light-emitting element 22 includes at least one of a blue light-emitting element and a green light-emitting element. Alternatively, the first light-emitting element 21 includes at least one of a red light-emitting element and a green light-emitting element, and the second light-emitting element 22 includes a blue light-emitting element.

Taking the micro LED as an example, the luminous efficiency of the red light-emitting element is lower than that of the green light-emitting element, and the luminous efficiency of the green light-emitting element is lower than that of the blue light-emitting element. Therefore, when displaying the same brightness or grayscale, the driving current required by the red light-emitting element is the largest, the driving current required by the blue light-emitting element is the smallest, and the driving current required by the green light-emitting element is in between the two.

Among the three light-emitting elements, the parameters of the pixel circuits corresponding to two ones of the light-emitting elements are the same. For example, the parameters of the pixel circuits of the blue light-emitting element and the parameters of the pixel circuits of the green light-emitting element are the same, or the parameters of the pixel circuits of the red light-emitting element and the parameters of the pixel circuits of the green light-emitting element are the same, and the same parameters include the width-to-length ratio of the transistor, the capacitance value of the capacitor, etc.

In embodiments of the present application, for light-emitting elements in three luminous colors, only two parameter pixel circuits may be set, which can reduce the process complexity.

Figure 10:
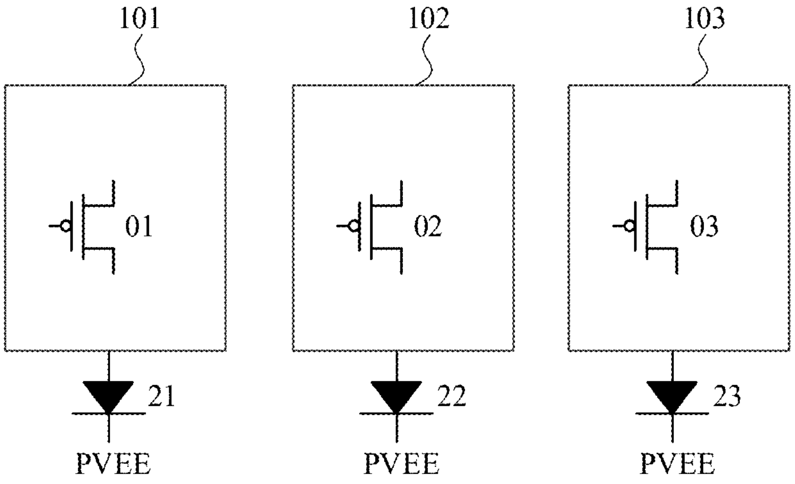
FIG. 10 is a schematic view of a pixel circuit in a display panel according to yet another embodiment of the present application.

In other embodiments, as shown in FIG. 10, the pixel circuit further includes a third pixel circuit 103, and the light-emitting element further includes a third light-emitting element 23 configured to drive the third light-emitting element 23. The light-emitting colors of the first light-emitting element 21, the second light-emitting element 22, and the third light-emitting element 23 are different.

The third pixel circuit 103 includes a third target transistor 03. The first target transistor 01, the second target transistor 02 and the third target transistor 03 have the same function. The width-to-length ratios of the first target transistor 01, the second target transistor 02, and the third target transistor 03 are all different.

The equivalent circuit structures of the first pixel circuit, the second pixel circuit, and the third pixel circuit may be the same. In other words, the number of devices and the connection relationship of various devices are same in the first pixel circuit, the second pixel circuit, and the third pixel circuit. The differences between the first pixel circuit, the second pixel circuit, and the third pixel circuit include: the sizes of the target transistors with the same functions being different, and the three being respectively configured to drive light-emitting elements in different light-emitting colors.

Since the driving current required by the red light-emitting element is the largest, the driving current required by the blue light-emitting element is the smallest, and the driving current required by the green light-emitting element is between the two. Therefore, when the first light-emitting element includes a red light-emitting element, the second light-emitting element includes a green light-emitting element, and the third light-emitting element includes a blue light-emitting element. The width-to-length ratio of the first target transistor is greater than that of the second target transistor, and the width-to-length ratio of the second target transistor is greater than that of the third target transistor.

The first target transistor 01, the second target transistor 02, and the third target transistor 03 may have the same functions, which may include: three transistors with the same connection relationship in the first pixel circuit, the second pixel circuit, and the third pixel circuit.

In embodiments of the present application, the sizes of the target transistors of the three pixel circuits corresponding to the three light-emitting elements are all set differently, which is more conducive to maximizing the optimization of the layout design.

Figure 11:
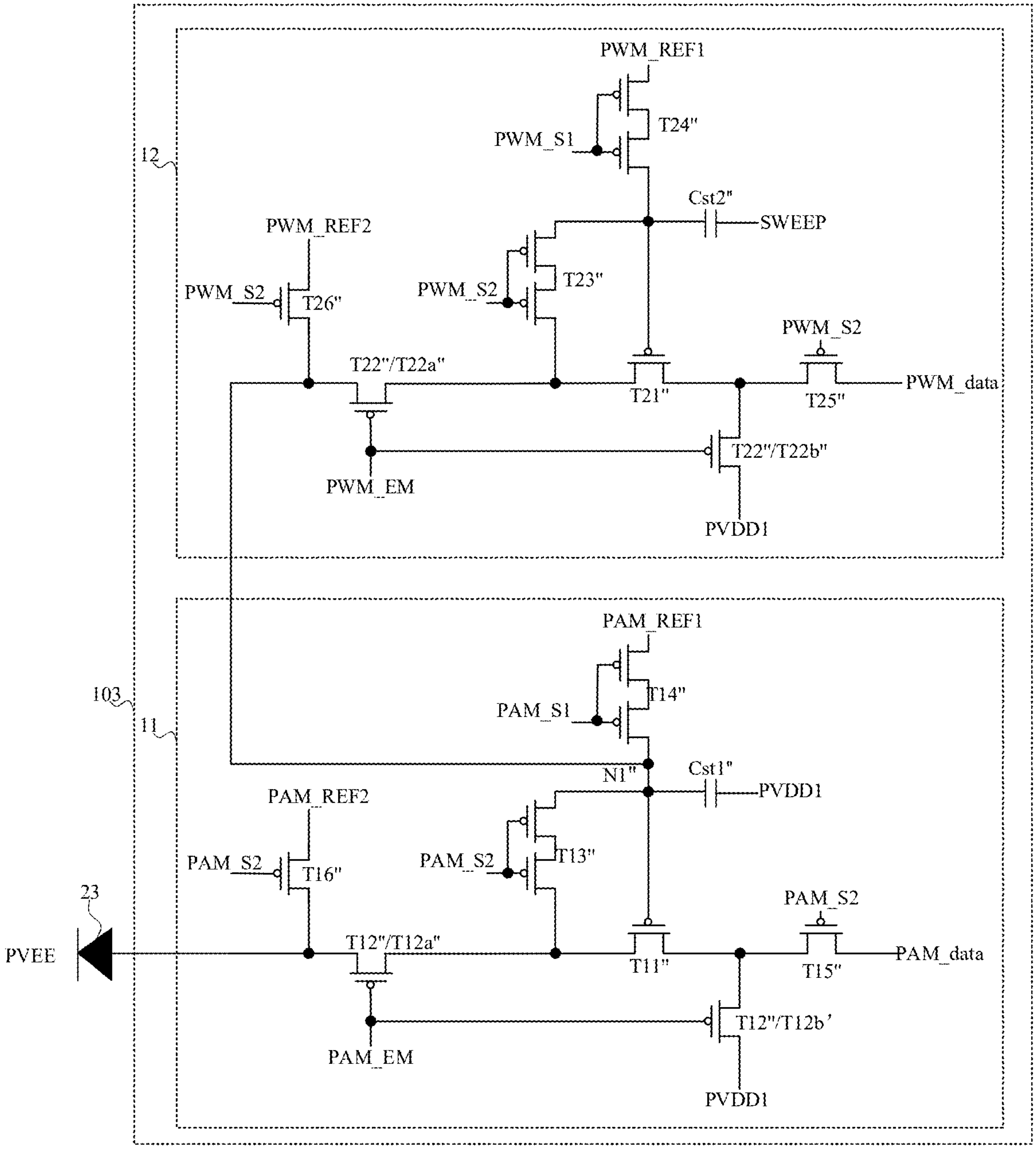
FIG. 11 is a schematic view of a third pixel circuit in a display panel according to an embodiment of the present application.
Figure 12:
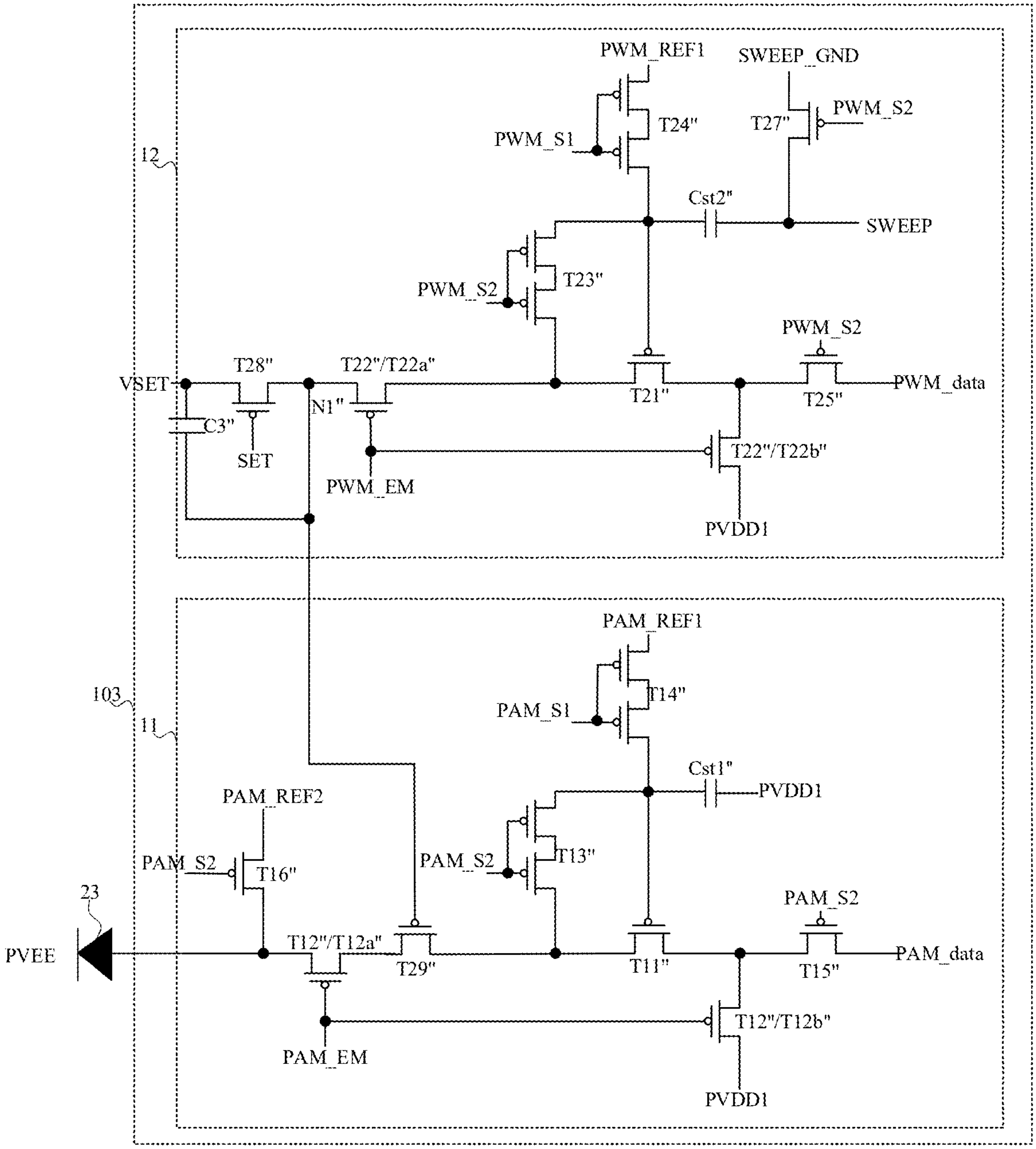
FIG. 12 is a schematic view of a third pixel circuit in a display panel according to another embodiment of the present application.
Figure 13:
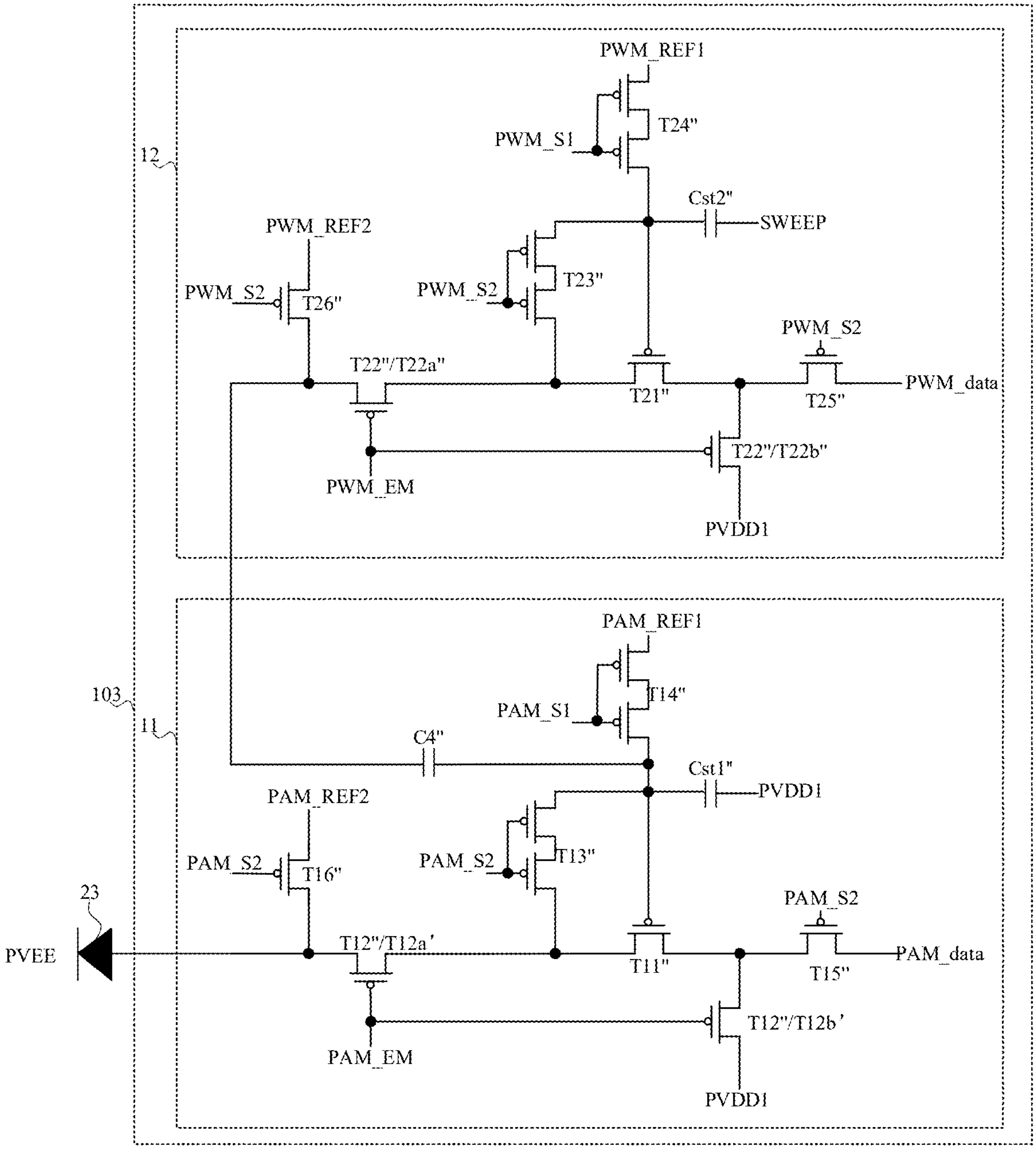
FIG. 13 is a schematic view of a third pixel circuit in a display panel according to yet another embodiment of the present application.

Exemplarily, FIGS. 11 to 13 show some exemplary circuit structures of the third pixel circuit 103. Referring to FIG. 4, FIG. 5 and FIG. 11, the amplitude modulation subcircuit 11 of the third pixel circuit 103 includes a fifth driving transistor T11" and a fifth light-emitting control transistor T12", and the pulse width modulation subcircuit 12 of the third pixel circuit 103 includes a sixth driving transistor T21" and a sixth light-emitting control transistor T22".

Exemplarily, the width-to-length ratio of the first driving transistor T11 is greater than that of the second driving transistor T11', and the width-to-length ratio of the second driving transistor T11' is greater than that of the fifth driving transistor T11'.

Exemplarily, the width-to-length ratio of the third driving transistor T21 is greater than that of the fourth driving transistor T21', and the width-to-length ratio of the fourth driving transistor T21' is greater than that of the sixth driving transistor T21'.

Exemplarily, the width-to-length ratio of the fifth driving transistor T11" is greater than that of the sixth driving transistor T21".

Exemplarily, the width-to-length ratio of the first light-emitting control transistor T12 is greater than that of the second light-emitting control transistor T12', and the width-to-length ratio of the second light-emitting control transistor T12' is greater than that of the fifth light-emitting control transistor T12".

Exemplarily, the width-to-length ratio of the third light-emitting control transistor T22 is greater than that of the fourth light-emitting control transistor T22', and the width-to-length ratio of the fourth light-emitting control transistor T22' is greater than that of the sixth light-emitting control transistor T22".

Exemplarily, the fifth light-emitting control transistor T12" includes a transistor T12*a*" and a transistor T12*b*", the transistor T12*a*" is adjacent to the third light-emitting element, and the width-to-length ratio of the transistor T12*a*" is greater than that of the transistor T12*b*".

Exemplarily, the sixth light-emitting control transistor T22" includes a transistor T22*a*" and a transistor T22*b*", the transistor T22*a*" is adjacent to the third light-emitting element, and the width-to-length ratio of the transistor T22*a*" is equal to that of the transistor T22*b*".

Exemplarily, please referring to FIG. 6, FIG. 7, and FIG. 12, the amplitude modulation submodule 11 of the third pixel circuit 103 further includes a third control transistor T29" and a third control capacitor C3".

Exemplarily, the width-to-length ratio of the first control transistor T29 is greater than that of the second control transistor T29', and the width-to-length ratio of the second control transistor T29' is greater than that of the third control transistor T29".

Exemplarily, the capacitance value of the first control capacitor C3 is greater than that of the second control capacitor C3', and the capacitance value of the second control capacitor C3' is greater than that of the third control capacitor C3".

In some embodiments, still taking the first light-emitting element including a red light-emitting element, the second light-emitting element including a green light-emitting element, and the third light-emitting element including a blue light-emitting element as an example, as shown in any one of FIGS. 11 to 13, the amplitude modulation subcircuit 11 of the third pixel circuit 103 includes a fifth storage capacitor Cst1", and the pulse width modulation subcircuit 12 in the third pixel circuit 103 includes a sixth storage capacitor Cst2".

The capacitance value of the first storage capacitor Cst1 is greater than that of the second storage capacitor Cst1', and the capacitance value of the second storage capacitor Cst1' is greater than that of the fifth storage capacitor Cst1'; and/or the capacitance value of the third storage capacitor Cst2 is greater than that of the fourth storage capacitor Cst2', and the capacitance value of the fourth storage capacitor Cst2' is greater than that of the sixth storage capacitor Cst2'.

The light-emitting elements in different colors have different requirements on driving current, and the driving current is stabilized by the storage capacitor in the pixel circuit. Therefore, in embodiments of the present application, the capacitance values of the storage capacitors corresponding to the three light-emitting elements in different colors are set to be inconsistent, which can flexibly match with the storage requirements of the three light-emitting elements in different colors and can reduce the layout area required for the storage capacitors in turn, thereby being more conducive to optimizing the layout design.

The width-to-length ratio of a transistor is the ratio of the channel width to the channel length of the transistor. The width-to-length ratios of transistors are different, which includes: at least one of the channel length and the channel width of different transistors is different.

Figure 14:
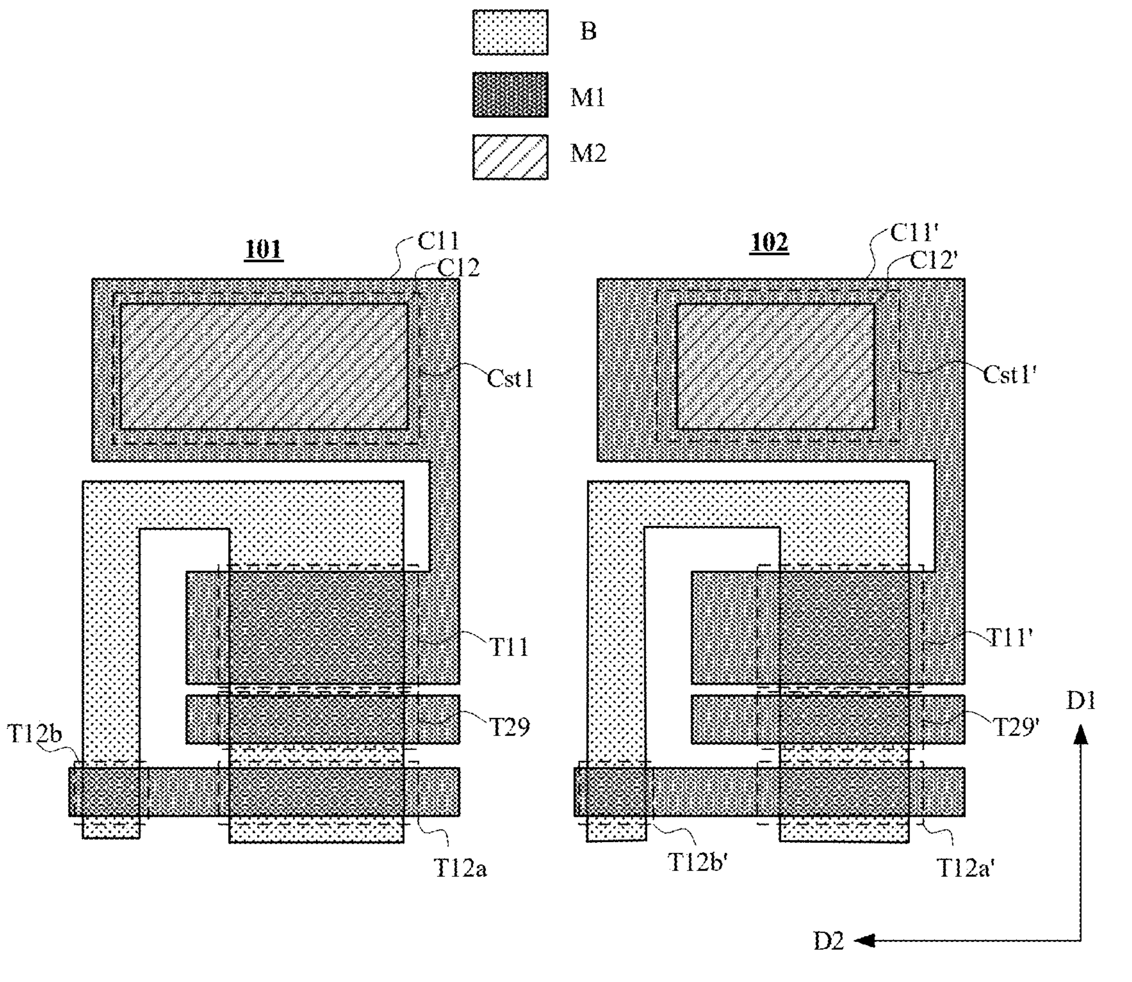
FIG. 14 is a schematic view of a layout of some devices in a display panel according to yet another embodiment of the present application.

As an example, as shown in FIG. 14, the filling with the same pattern in FIG. 14 represents the same film layer, B represents the film layer where the semiconductor of the transistor is located, M1 represents the film layer where the gate of the transistor is located, and M2 represents the film layer where an electrode plate of the capacitor is located. The capacitor includes two opposite electrode plates, one of which is located in the film layer M1. The first direction D1 represents the length direction the channel of the transistor shown in the FIG. 14, and the second direction D2 represents the width direction of the channel of the transistor shown in FIG. 14.

Please referring to FIGS. 6, 7 and 14. For example, the channel length of the first driving transistor T11 is equal to that of the second driving transistor T11', and the channel width of the first driving transistor T11 is greater than that of the second driving transistor T11', so that the width-to-length ratio of the first driving transistor T11 is greater than that of the second driving transistor T11'.

For another example, the channel length of the first light-emitting control sub-transistor T12*a* is equal to that of the third light-emitting control sub-transistor T12*a'*, and the channel width of the first light-emitting control sub-transistor T12*a* is greater than that of the third light-emitting control sub-transistor T12*a'*, so that the width-to-length ratio of the first light-emitting control sub-transistor T12*a* is greater than that of the third light-emitting control sub-transistor T12*a'*.

When the first target transistor and the second target transistor are transistors with other functions, similar designs can also be used; for example, the first control transistor T29 and the second control transistor T29' can be similarly designed, which will not be described in detail here. Similarly, a similar design can also be used for the third target transistor, which will not be described in detail here.

Exemplarily, the first storage capacitor Cst1 includes a first electrode plate C11 and a second electrode plate C12; the second storage capacitor Cst1' includes a third electrode plate C11' and a fourth electrode plate C12'; the first electrode plate C11 and the third electrode plate C11' are located in the same film layer and have the same area; the second electrode plate C12 and the fourth electrode plate C12' are located in the same film layer, and the area of the second electrode plate C12 is greater than the area of the fourth electrode plate C12'. Therefore, the capacitance value of the first storage capacitor Cst1 is greater than that of the second storage capacitor Cst1'.

It is understandable that the capacitance value of a capacitor is not only related to the directly facing area of the two electrode plates, but also to the thickness of the medium between the two electrode plates and the dielectric constant of the medium. Therefore, the capacitance values of the two capacitors can be different by differentially setting the thickness of the medium and the dielectric constant of the medium between the electrode plates of the two capacitors.

In some embodiments, the width-to-length ratios of the first target transistor and the second target transistor are different, including: the channel length of the first target transistor and the channel length of the second target transistor are equal, and the channel width of the first target transistor and the channel width of the second target transistor are not equal. In other words, the channel lengths of the two transistors is kept unchanged, and the channel width of at least one transistor is modulated, so that the width-to-length ratios of the two transistors are different. This design method can achieve transistor differentiation without making the process too complicated.

Here, the first target transistor and the second target transistor may each include transistors in any of the above examples. For example, the first driving transistor T11 and the second driving transistor T11' have the same channel length, and the channel width of the first driving transistor T11 is greater than that of the second driving transistor T11', so that the width-to-length ratio of the first driving transistor T11 is greater than that of the second driving transistor T11'. The case that the first target transistor and the second target transistor include transistors with other functions is the same, and details are not described herein one by one.

Figure 15:
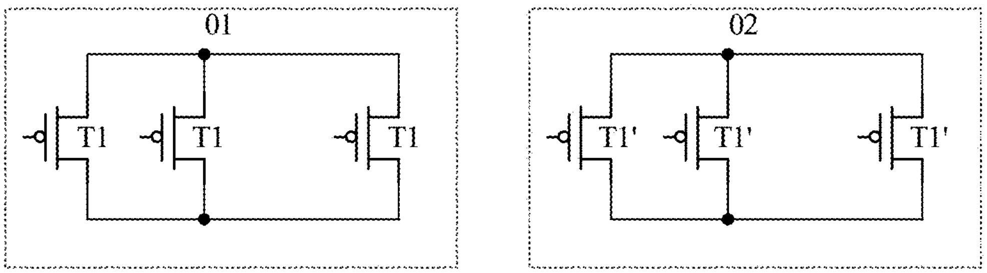
FIG. 15 is a schematic view of a target transistor in a display panel according to yet another embodiment of the present application.

In some embodiments, as shown in FIG. 15, the first target transistor 01 includes n1 first transistors T1 connected in parallel, and the second target transistor 02 includes n2 second transistors T1' connected in parallel, where n1 and n2 are integers greater than 1. The gates of the n1 first transistors T1 are connected to the same signal, and the gates of the n2 second transistors T1' are connected to the same signal.

The channel length of each first transistor T1 is L1, and the channel width of each first transistor T1 is W1; the channel length of each second transistor T1' is L2, and the channel width of each second transistor T1' is W2.

It is understandable that the channel lengths and the channel widths of the first transistors T1 are equal, so the total width-to-length ratio of n1 first transistors T1 is: n1*W1/L1. Similarly, the total width-to-length ratio of n2 second transistors T1' is: n2*W2/L2.

In the embodiment of the present application, the first target transistor substantially consists of a plurality of first transistors in the same size connected in parallel, so that it is relatively convenient to achieve the regulation of the total width-to-length ratio of the first target transistor; for example, the total width-to-length ratio of the first target transistor can be regulated by regulating the number of the first transistors connected in parallel. The second target transistor substantially consists of a plurality of second transistors in the same size connected in parallel, so that it is relatively convenient to achieve the regulation of the total width-to-length ratio of the second target transistor; for example, the total width-to-length ratio of the second target transistor can be regulated by regulating the number of the second transistors connected in parallel.

In some embodiments, L1=L2. Thus, the width-to-length ratio difference between the first target transistor and the second target transistor can be achieved by controlling the difference between W1 and W2, and/or the difference between n1 and n2.

In some embodiments, W1=W2, n1≠n2. For example, when the width-to-length ratio difference between the first target transistor and the second target transistor is large, W1 and W2 can be kept the same, and the numbers of n1 and n2 can be changed, so that it is easier to achieve a relatively large difference between the width-to-length ratio of the first target transistor and the second target transistor.

In some embodiments, W1≠W2, and n1=n2. For example, when the difference between the width-to-length ratio of the first target transistor and the second target transistor is small, n1 and n2 can be kept the same, and the channel width of the transistor can be fine-tuned, so that it is easier to achieve a relatively small difference between the width-to-length ratio of the first target transistor and that of the second target transistor.

It should be noted that the first target transistor substantially consists of a plurality of first transistors in the same size connected in parallel, and the second target transistor substantially consists of a plurality of second transistors in the same size connected in parallel. This technical concept is applicable to any set of transistors with the same function but different width-to-length ratios.

For example, the first driving transistor substantially consists of a plurality of first transistors in the same size connected in parallel, and the second driving transistor substantially consists of a plurality of second transistors in the same size connected in parallel. For another example, the first light-emitting control transistor substantially consists of a plurality of first transistors in the same size connected in parallel, and the second light-emitting control transistor substantially consists of a plurality of second transistors in the same size connected in parallel. These are not described one by one here.

It should be noted that the transistor in embodiments of the present application can be an N-type transistor or a P-type transistor. For an N-type transistor, the on level is a high level, and the off level is a low level. That is, when the gate potential of the N-type transistor is a high level, the first pole and the second pole conduct, and when the gate potential of the N-type transistor is a low level, the first pole and the second pole of the N-type transistor are turned off. For a P-type transistor, the on level is a low level, and the off level is a high level. That is, when the gate potential of the P-type transistor is a low level, the first pole and the second pole of the P-type transistor conduct, and when the gate potential of the P-type transistor is a high level, the first pole and the second pole are disconnected. In a specific implementation, the gate of each of the above-mentioned transistors serves as its control electrode; its first pole serves as the source, and its second pole serves as the drain, or its first pole serves as the drain, and its second pole serves as the source, and no distinction is made here according to the signal of the gate of each transistor and its type. The source and drain of a transistor can sometimes be used interchangeably, and sometimes the source and the drain of a transistor can be collectively referred to as a source/drain. In addition, the on level and off level in embodiments of the present application are both general terms, the on level refers to any level enabling the transistor to turn on, and the off level refers to any level enabling the transistor to be cut off/turned off.

Figure 16:
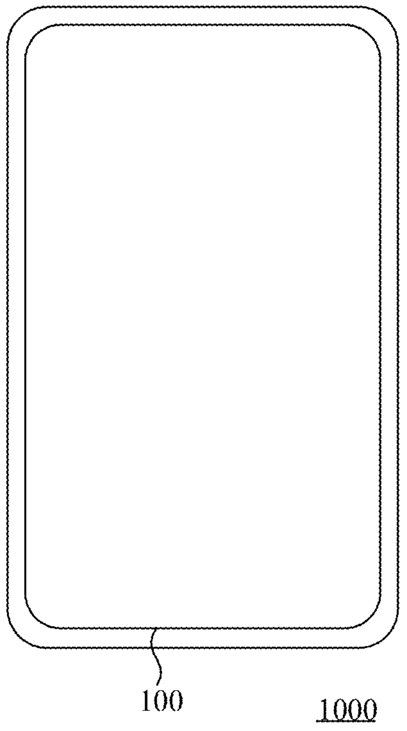
FIG. 16 is a schematic view of a display apparatus according to yet another embodiment of the present application.

The present application also provides a display apparatus, including the display panel provided by the embodiments in the present application. Referring to FIG. 16, which is is a schematic view of a display apparatus according to yet another embodiment of the present application. The display device 1000 provided in FIG. 16 includes a display panel 100 provided in any of the above embodiments of the present application. The embodiments shown in FIG. 16 only takes a mobile phone as an example to illustrate the display device 1000. It can be understood that the display device provided in embodiments of the present application can be a wearable product, a computer, a television, a car display device, or other display devices with display functions, and the present application does not make specific restrictions on this. The display apparatus provided in embodiments of the present application has the beneficial effects of the display panel provided in the embodiment of the present application. For details, please refer to the specific description of the display panel in the above embodiments, and this embodiment will not be repeated here.

What is claimed is:

1. A display panel comprising:

a plurality of light-emitting elements, at least one of which comprises a first light-emitting element and a second light-emitting element with different emission colors; and a plurality of pixel circuits, at least one of which comprises an amplitude modulation subcircuit and a pulse width modulation subcircuit, the pixel circuits comprising a first pixel circuit configured to drive the first light-emitting element and comprising a first target transistor, and a second pixel circuit configured to drive the second light-emitting element and comprising a second target transistor with a same function as that of the first target transistor and a different width-to-length ratio from that of the first target transistor;

wherein the first pixel circuit comprises the amplitude modulation subcircuit which comprises a first driving transistor, the second pixel circuit comprises the amplitude modulation subcircuit which comprises a second driving transistor, the first pixel circuit comprises the pulse width modulation subcircuit which comprises a third driving transistor, the second pixel circuit comprises the pulse width modulation subcircuit which comprises a fourth driving transistor;

the first target transistor comprises the first driving transistor, and the second target transistor comprises the second driving transistor; or the first target transistor comprises the third driving transistor, and the second target transistor comprises the fourth driving transistor;

a width-to-length ratio of the first driving transistor is greater than that of the second driving transistor, and/or a width-to-length ratio of the third driving transistor is greater than that of the fourth driving transistor; and the width-to-length ratio of the first driving transistor is greater than that of the third driving transistor, and/or the width-to-length ratio of the second driving transistor is greater than that of the fourth driving transistor.

2. The display panel according to claim 1, wherein the amplitude modulation subcircuit of the first pixel circuit comprises a first storage capacitor, the amplitude modulation subcircuit in the second pixel circuit comprises a second storage capacitor; the pulse width modulation subcircuit of the first pixel circuit comprises a third storage capacitor, and the pulse width modulation subcircuit in the second pixel circuit comprises a fourth storage capacitor;

wherein a capacitance value of the first storage capacitor is greater than that of the second storage capacitor, and/or a capacitance value of the third storage capacitor is greater than that of the fourth storage capacitor.

3. The display panel according to claim 2, wherein a difference between the capacitance value of the first storage capacitor and the capacitance value of the second storage capacitor is $\Delta C1$, a difference between the capacitance value of the third storage capacitor and the capacitance value of the fourth storage capacitor is $\Delta C2$, and $\Delta C1>\Delta C2$.

4. The display panel according to claim 1, wherein the amplitude modulation subcircuit of the first pixel circuit comprises a first control transistor, and the pulse width modulation subcircuit of the first pixel circuit is connected to a gate of the first control transistor;

wherein the amplitude modulation subcircuit in the second pixel circuit comprises a second control transistor, and the pulse width modulation subcircuit of the second pixel circuit is connected to a gate of the second control transistor;

wherein the first target transistor comprises the first control transistor, and the second target transistor comprises the second control transistor; and wherein a width-to-length ratio of the first control transistor is greater than that of the second control transistor.

5. The display panel according to claim 4, wherein a ratio of a width-to-length ratio of the first driving transistor to that of the second driving transistor is B1, a ratio of a width-to-length ratio of the third driving transistor to that of the fourth driving transistor is B2, a ratio of the width-to-length ratio of the first control transistor to that of the second control transistor is B3, and B3=B1, or B3=B2.

6. The display panel according to claim 4, wherein the pulse width modulation subcircuit of the first pixel circuit comprises a first control capacitor, and the first control capacitor is connected to a gate of the first control transistor;

wherein the pulse width modulation subcircuit of the second pixel circuit comprises a second control capacitor connected to a gate of the second control transistor; and wherein a capacitance value of the first control capacitor is greater than that of the second control capacitor.

7. The display panel according to claim 1, wherein a channel length of the first target transistor is equal to that of the second target transistor, and a channel width of the first target transistor is not equal to that of the second target transistor.

8. The display panel according to claim 1, wherein the first target transistor comprises n1 first transistors connected in parallel, and the second target transistor comprises n2 second transistors connected in parallel, where n1 and n2 are integers greater than 1;

wherein a channel length of each first transistor is L1, and a channel width of each first transistor is W1;

a channel length of each second transistor is L2, and a channel width of each second transistor is W2.

9. The display panel according to claim 8, wherein W1=W2, n1≠n2; or W1 W2, n1=n2, and L1=L2.

10. The display panel according to claim 1, wherein the first light-emitting element comprises a red light-emitting element, and the second light-emitting element comprises at least one of a blue light-emitting element or a green light-emitting element; or the first light-emitting element comprises at least one of a red light-emitting element or a green light-emitting element, and the second light-emitting element comprises a blue light-emitting element.

11. The display panel according to claim 1, wherein, the plurality of the light-emitting elements further comprise a third light-emitting element, the plurality of the pixel circuits further comprise a third pixel circuit, and the first light-emitting element, the second light-emitting element, and the third light-emitting element are in different light-emitting colors;

the third pixel circuit comprises a third target transistor, and the first target transistor, the second target transistor, and the third target transistor have a same function;

the width-to-length ratios of the first target transistor, the second target transistor, and the third target transistor are all different.

12. The display panel according to claim 11, wherein the first light-emitting element comprises a red light-emitting element, the second light-emitting element comprises a green light-emitting element, and the third light-emitting element comprises a blue light-emitting element;

the width-to-length ratio of the first target transistor is greater than that of the second target transistor, and the width-to-length ratio of the second target transistor is greater than that of the third target transistor.

13. The display panel according to claim 11, wherein the first light-emitting element comprises a red light-emitting element, the second light-emitting element comprises a green light-emitting element, and the third light-emitting element comprises a blue light-emitting element;

wherein the amplitude modulation subcircuit in the first pixel circuit comprises a first storage capacitor, the amplitude modulation subcircuit in the second pixel circuit comprises a second storage capacitor; the pulse width modulation subcircuit of the first pixel circuit comprises a third storage capacitor, and the pulse width modulation subcircuit in the second pixel circuit comprises a fourth storage capacitor;

wherein the amplitude modulation subcircuit in the third pixel circuit comprises a fifth storage capacitor, and the pulse width modulation subcircuit in the third pixel circuit comprises a sixth storage capacitor; and wherein a capacitance value of the first storage capacitor is greater than that of the second storage capacitor, and a capacitance value of the second storage capacitor is greater than that of the fifth storage capacitor; and/or a capacitance value of the third storage capacitor is greater than that of the fourth storage capacitor, and a capacitance value of the fourth storage capacitor is greater than that of the sixth storage capacitor.

14. A display panel comprising:

a plurality of light-emitting elements, at least one of which comprises a first light-emitting element and a second light-emitting element with different emission colors; and a plurality of pixel circuits, each of which comprises an amplitude modulation subcircuit and a pulse width modulation subcircuit, the pixel circuits comprising a first pixel circuit configured to drive the first light-emitting element and comprising a first target transistor, and a second pixel circuit configured to drive the second light-emitting element and comprising a second target transistor with a same function as that of the first target transistor and a different width-to-length ratio from that of the first target transistor;

wherein the first pixel circuit comprises the amplitude modulation subcircuit which comprises a first light-emitting control transistor, the second pixel circuit comprises the amplitude modulation subcircuit which comprises a second light-emitting control transistor, the first pixel circuit comprises the pulse width modulation subcircuit which comprises a third light-emitting control transistor, and the second pixel circuit comprises the pulse width modulation subcircuit which comprises a fourth light-emitting control transistor;

the first target transistor comprises the first light-emitting control transistor, and the second target transistor comprises the second light-emitting control transistor; or the first target transistor comprises the third light-emitting control transistor, and the second target transistor comprises the fourth light-emitting control transistor;

a width-to-length ratio of the first light-emitting control transistor is greater than that of the second light-emitting control transistor, and/or a width-to-length ratio of the third light-emitting control transistor is greater than that of the fourth light-emitting control transistor; and the amplitude modulation subcircuit of the first pixel circuit further comprises a first driving transistor, the amplitude modulation subcircuit of the second pixel circuit further comprises a second driving transistor, the pulse width modulation subcircuit of the first pixel circuit further comprises a third driving transistor, and the pulse width modulation subcircuit of the second pixel circuit further comprises a fourth driving transistor;

the width-to-length ratio of the first light-emitting control transistor is greater than that of the first driving transistor; and/or the width-to-length ratio of the second light-emitting control transistor is greater than that of the second driving transistor; and/or the width-to-length ratio of the third light-emitting control transistor is greater than that of the third driving transistor; and/or the width-to-length ratio of the fourth light-emitting control transistor is greater than that of the fourth driving transistor.

15. The display panel according to claim 14, wherein the first light-emitting control transistor comprises a first light-emitting control sub-transistor and a second light-emitting control sub-transistor, two ends of the first light-emitting control sub-transistor are respectively connected to the first light-emitting element and the second light-emitting control sub-transistor, and two ends of the second light-emitting control sub-transistor are respectively connected to the first light-emitting control sub-transistor and a first power supply terminal;

wherein a width-to-length ratio of the first light-emitting control sub-transistor is greater than that of the second light-emitting control sub-transistor; and/or the second light-emitting control transistor comprises a third light-emitting control sub-transistor and a fourth light-emitting control sub-transistor, two ends of the third light-emitting control sub-transistor are respectively connected to the second light-emitting element and the fourth light-emitting control sub-transistor, and two ends of the fourth light-emitting control sub-transistor are respectively connected to the third light-emitting control sub-transistor and the first power supply terminal;

a width-to-length ratio of the third light-emitting control sub-transistor is greater than that of the fourth light-emitting control sub-transistor.

16. The display panel according to claim 14, wherein an absolute value of a difference between a width-to-length ratio of the first driving transistor and that of the second driving transistor is $|\Delta A1|$, an absolute value of a difference between the width-to-length ratio of the first light-emitting control transistor and that of the second light-emitting control transistor is $|\Delta A2|$, an absolute value of a difference between a width-to-length ratio of the third driving transistor and that of the fourth driving transistor is $|\Delta A3|$, and $|\Delta A2|>|\Delta A1|>|\Delta A3|$.

17. A display apparatus comprising a display panel which comprises:

a plurality of light-emitting elements, at least one of which comprises a first light-emitting element and a second light-emitting element in different light-emitting colors; and a plurality of pixel circuits, at least one of which comprises an amplitude modulation subcircuit and a pulse width modulation subcircuit, the pixel circuits comprising a first pixel circuit configured to drive the first light-emitting element and comprising a first target transistor, and a second pixel circuit configured to drive the second light-emitting element and comprising a second target transistor with a same function as that of the first target transistor and a different width-to-length ratio from that of the first target transistor;

wherein the first pixel circuit comprises the amplitude modulation subcircuit which comprises a first driving transistor, the second pixel circuit comprises the amplitude modulation subcircuit which comprises a second driving transistor, the first pixel circuit comprises the pulse width modulation subcircuit which comprises a third driving transistor, the second pixel circuit comprises the pulse width modulation subcircuit which comprises a fourth driving transistor;

the first target transistor comprises the first driving transistor, and the second target transistor comprises the second driving transistor; or the first target transistor comprises the third driving transistor, and the second target transistor comprises the fourth driving transistor;

a width-to-length ratio of the first driving transistor is greater than that of the second driving transistor, and/or a width-to-length ratio of the third driving transistor is greater than that of the fourth driving transistor; and the width-to-length ratio of the first driving transistor is greater than that of the third driving transistor, and/or the width-to-length ratio of the second driving transistor is greater than that of the fourth driving transistor.

* * * * *